(12) United States Patent
Kosugi et al.

(10) Patent No.: US 10,000,679 B2
(45) Date of Patent: Jun. 19, 2018

(54) PHENOLIC RESIN COMPOSITION

(71) Applicant: Hitachi Chemical Company, Ltd., Tokyo (JP)

(72) Inventors: Shinichi Kosugi, Ibaraki (JP); Haruaki Sue, Ibaraki (JP); Yoshitaka Takezawa, Ibaraki (JP); Hiroyuki Takahashi, Ibaraki (JP); Naoki Hara, Ibaraki (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days. days.

(21) Appl. No.: 14/411,814

(22) PCT Filed: Jun. 20, 2013

(86) PCT No.: PCT/JP2013/067001
§ 371 (c)(1),
(2) Date: Dec. 29, 2014

(87) PCT Pub. No.: WO2014/007068
PCT Pub. Date: Jan. 9, 2014

(65) Prior Publication Data
US 2015/0144835 A1     May 28, 2015

(30) Foreign Application Priority Data
Jul. 5, 2012   (JP) .................. 2012-151657

(51) Int. Cl.
*B32B 27/38*   (2006.01)
*C08L 63/00*   (2006.01)
(Continued)

(52) U.S. Cl.
CPC .................. *C09K 5/14* (2013.01); *C08G 8/10* (2013.01); *C08G 8/12* (2013.01); *C08G 8/20* (2013.01);
(Continued)

(58) Field of Classification Search
None
See application file for complete search history.

(56) References Cited

U.S. PATENT DOCUMENTS

2009/0171061 A1   7/2009   Sue et al.

FOREIGN PATENT DOCUMENTS

| JP | H 06-128360 | 5/1994 |
| JP | H 10-147628 | 6/1998 |

(Continued)

OTHER PUBLICATIONS

Machine translation of JP 2001-131391 A (no date).*

(Continued)

*Primary Examiner* — Michael J Feely
(74) *Attorney, Agent, or Firm* — Seyfarth Shaw LLP

(57) ABSTRACT

Provided is a phenolic resin composition containing: an epoxy resin curing agent that contains a hydroxybenzene derivative represented by the following Formula (I) and a phenol resin having at least one partial structure selected from the group consisting of the following Formulae (IIa), (IIb), (IIc) and (IId); and an epoxy resin. In these Formulae, each of $R^1$, $R^2$, $R^3$, $R^4$ and $R^5$ independently represents a hydroxy group, a hydrogen atom or an alkyl group; at least two of $R^1$, $R^2$, $R^3$, $R^4$ and $R^5$ are hydroxy groups; each Ar independently represents at least one group selected from the group consisting of the following Formulae (IIIa) and (IIIb); each of $R^{11}$ and $R^{14}$ independently represents a hydrogen atom or a hydroxy group; and each of $R^{12}$ and $R^{13}$ independently represents a hydrogen atom or an alkyl group.

(Continued)

-continued

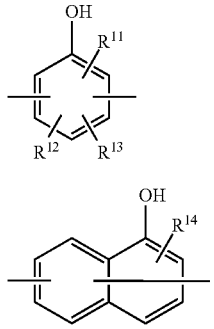

(IIIa)

(IIIb)

16 Claims, 4 Drawing Sheets

(51) Int. Cl.
| | |
|---|---|
| C08G 59/24 | (2006.01) |
| C08G 59/62 | (2006.01) |
| C09K 5/14 | (2006.01) |
| C08G 8/20 | (2006.01) |
| C08G 8/36 | (2006.01) |
| C08G 59/68 | (2006.01) |
| C08G 8/10 | (2006.01) |
| C08G 8/12 | (2006.01) |
| C08G 8/22 | (2006.01) |
| C08G 8/24 | (2006.01) |
| C08L 61/06 | (2006.01) |
| C08L 61/12 | (2006.01) |
| C08L 61/14 | (2006.01) |
| H01L 23/29 | (2006.01) |
| H01L 23/31 | (2006.01) |

(52) U.S. Cl.
CPC ............... *C08G 8/22* (2013.01); *C08G 8/24* (2013.01); *C08G 8/36* (2013.01); *C08G 59/621* (2013.01); *C08G 59/688* (2013.01); *C08L 61/06* (2013.01); *C08L 61/12* (2013.01); *C08L 61/14* (2013.01); *C08L 63/00* (2013.01)

(56) References Cited

FOREIGN PATENT DOCUMENTS

| | | | | |
|---|---|---|---|---|
| JP | 2000-154237 | 6/2000 | | |
| JP | 2001-55425 | 2/2001 | | |
| JP | 2001-131391 A | * 5/2001 | ............ | C08L 63/00 |
| JP | 3375976 | 2/2003 | | |
| JP | 2003-137950 | 5/2003 | | |
| JP | 2005-281675 | 10/2005 | | |
| JP | 2007-262398 | 10/2007 | | |
| JP | 2008-013759 | 1/2008 | | |
| JP | 4118691 | 7/2008 | | |
| JP | 4595497 | 12/2010 | | |
| JP | 4619770 | 1/2011 | | |
| JP | 4654475 | 3/2011 | | |
| JP | 2013-133437 | 7/2013 | | |
| WO | WO 98/55523 | 12/1998 | | |
| WO | WO 2007/086415 | 8/2007 | | |
| WO | WO 2012/002546 | 1/2012 | | |

OTHER PUBLICATIONS

Machine translation of JP 2007-262398 A (no date).*
Notice of Examination Report issued in Taiwan Patent Application No. 102123493 dated Sep. 9, 2016.
Notice of Reasons for Rejection issued in Japanese Patent Application No. 2014-523669 dated Mar. 28, 2017.

* cited by examiner

[Fig.1]
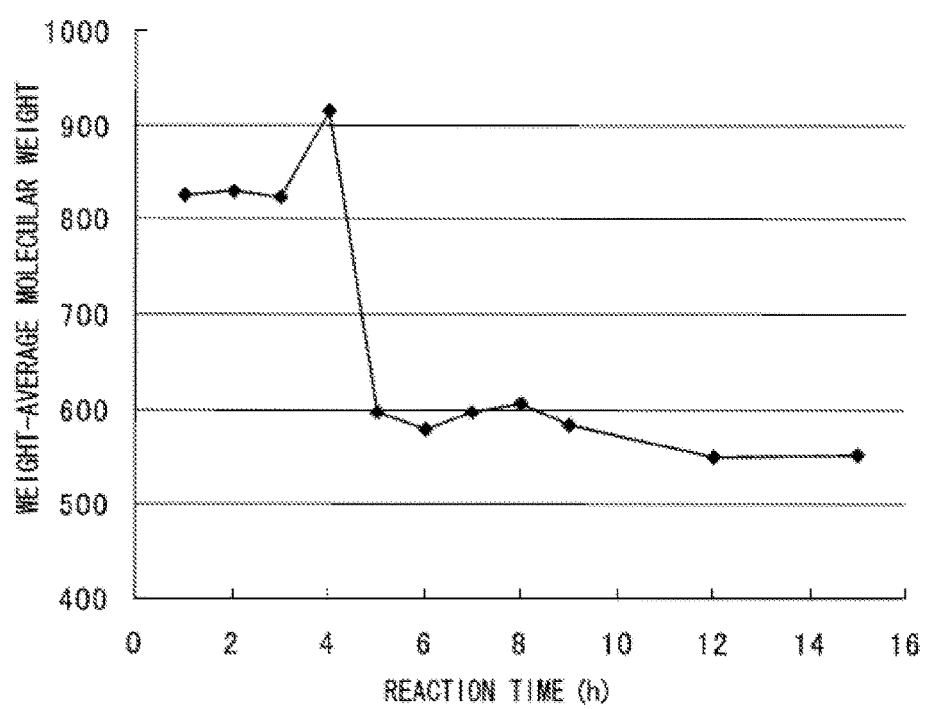

[Fig.2]
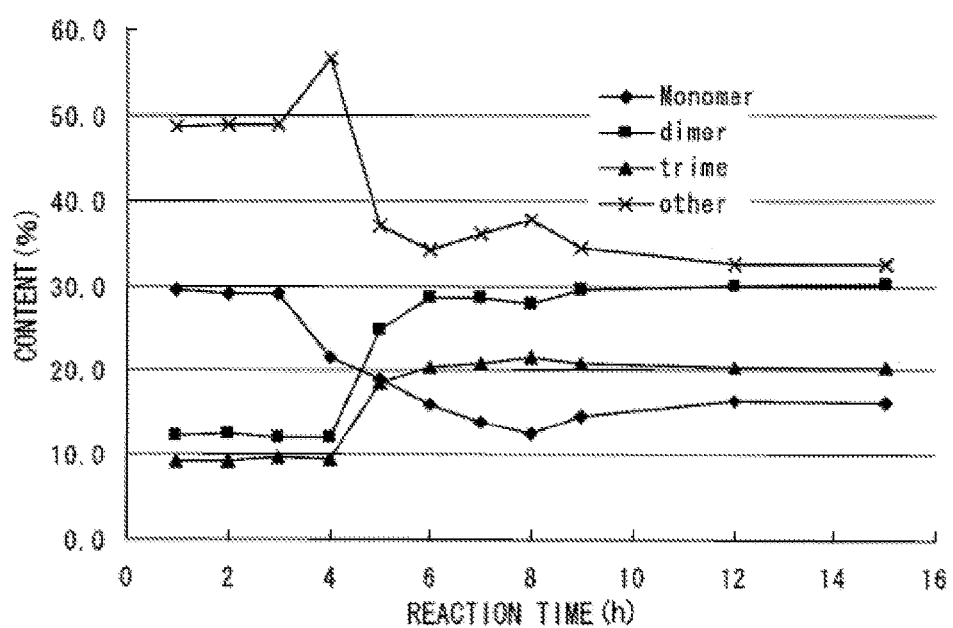

[Fig.3]
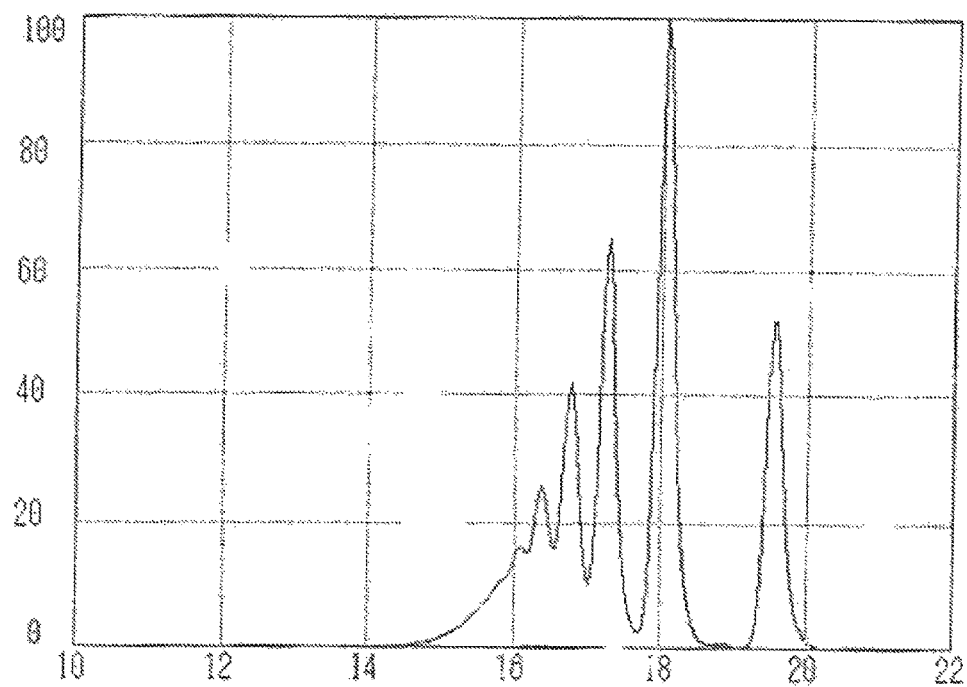

[Fig.4]
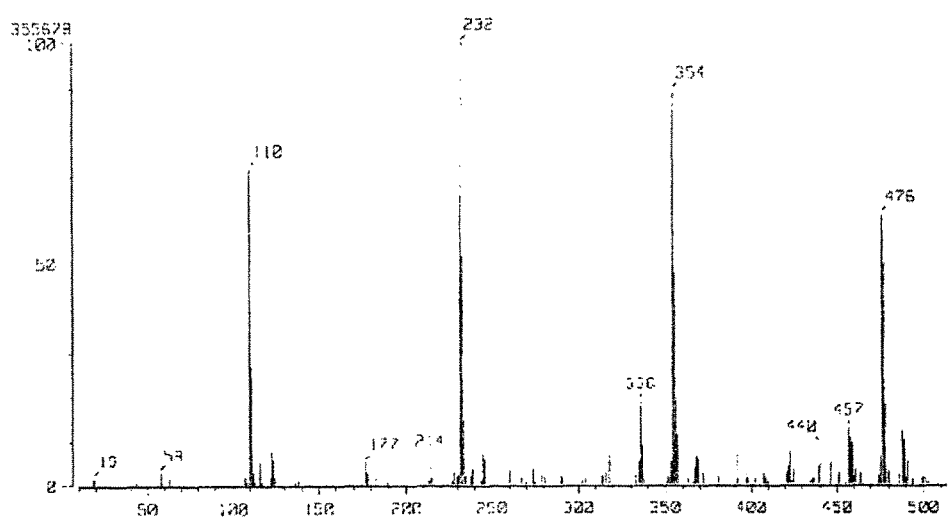

PHENOLIC RESIN COMPOSITION

CROSS-REFERENCE TO RELATED APPLICATION

This application is a United States National Stage Application of PCT International Patent Application No. PCT/JP2013/067001, which was filed Jun. 20, 2013, which claims priority to Japanese Patent Application No. 2012-151657, which was filed Jul. 5, 2012, the disclosure of each of which is incorporated herein by reference in its entirety.

TECHNICAL FIELD

The present invention relates to a phenolic resin composition.

BACKGROUND ART

Phenol resins, because of their excellent insulating properties, heat resistance and chemical resistance, have been used in a number of electronic materials as a constituent of a composite material containing various fillers. Particularly, as curing agents of various epoxy resins, many special phenol resins that are optimized in accordance with the required properties such as expansion coefficient, heat resistance, glass transition temperature (hereinafter, may be abbreviated as "Tg"), flexibility and water absorption have been studied and developed.

Resin compositions in which a phenol resin is used as a curing agent of an epoxy resin have been used in the cutting-edge electronic component applications. In recent years, performance enhancement and down-sizing of these electronic components have been rapidly advanced and, consequently, there is a problem as to how to dissipate the heat generated inside the components.

Resin compositions show excellent insulating properties and, also from the standpoints of their easiness of molding and processing, heat resistance and the like, resin compositions can be useful as heat dissipating materials. However, the thermal conductivities of ordinary resin compositions are lower by 1 to 3 figures than those of heat dissipating materials such as metals and ceramics. Therefore, in cutting-edge electronic components where an even higher thermal conductivity is required, there are cases where effective heat dissipation property cannot be attained.

As a practical method of using a resin composition, a method of preparing a composite material by mixing a resin composition with an inorganic filler having high thermal conductivity is known. However, in such a composite material in which an inorganic filler is mixed, since the thermal conductivity of the resin composition itself is low, in order to obtain effective thermal conductivity, it is required to mix a large amount of inorganic filler. The thermal conductivity of a resin composition is improved by mixing therein an inorganic filler having high thermal conductivity; however, this may cause a marked increase in the viscosity of the resulting composite material before molding, leading to extremely poor fluidity and filling properties. Therefore, an improvement in the thermal conductivity of a resin composition contained in a composite material is a very important problem.

For the above-described problems, there is an increasing number of reports where it is tried to improve the thermal conductivity of a resin composition from a structural perspective of an epoxy resin (see, for example, Japanese Patent No. 4118691, Japanese Patent Application Laid-Open (JP-A) No. 2008-13759, Japanese Patent No. 4595497 and Japanese Patent No. 4619770). As such reports, it has also been reported that, for example, by using an epoxy resin or the like having a so-called mesogen group of a biphenyl skeleton or the like in combination with a novolac-phenol resin derived from catechol, resorcinol or the like and increasing the orientation of the post-curing resin skeleton, the internal heat resistance can be reduced and the thermal conductivity of the resulting resin composition can thus be improved.

In WO 2007/086415, the present inventors reported that a novel phenol resin having a phenolic hydroxy group-containing xanthene derivative in the main chain can be obtained by performing a reaction using a dihydroxybenzene under special reaction conditions. Further, in JP-A No. 2007-262398, the present inventors also reported that a resin cured product showing high thermal conductivity can be obtained when this novel phenol resin is used as an epoxy resin curing agent.

Thus far, the present inventors discovered methods of producing a phenol resin having a xanthene derivative structure in the main chain. One example thereof is a method of producing a phenol resin having a xanthene derivative structure in the main chain in one step by allowing a naphthol or a dihydroxybenzene and an aldehyde to undergo a reaction in the presence of an acid catalyst under simple but special reaction conditions and thereby performing intramolecular dehydration and cyclization of the hydroxy groups between adjacent naphthol and phenol nuclei bound via 2,2'-methylene linkage (see, for example, WO 98/55523 and Japanese Patent No. 3375976). Particularly, in WO 2007/086415, it is described that a phenol resin having a phenolic hydroxy group-containing xanthene derivative structure in the main chain can be obtained.

Until now, it has been reported that a novolac phenol resin can be obtained by allowing a dihydroxybenzene such as catechol or resorcinol to react with formaldehyde or the like in the presence of an acid catalyst (see, for example, JP-A No. 2003-137950, JP-A No. 2005-281675 and JP-A No. 2001-55425). However, according to these documents, those novolac phenol resins that are obtained using catechol, resorcinol or the like have a hydroxy equivalent of about 60 and do not contain the phenolic hydroxy group-containing xanthene derivative structure described in WO 2007/086415.

Furthermore, in JP-A No. H10-147628, novolac phenol resins having a hydroxy equivalent of 75 or 77 that are obtained using a dihydroxybenzene are reported. However, since these phenol resins both use an aldehyde having an alkyl group, it is believed that the increase in the hydroxy equivalent is attributed to an effect of the substituent, not to the incorporation of a xanthene derivative structure.

SUMMARY OF INVENTION

Technical Problem

The resin composition described in JP-A No. 2007-262398 shows higher thermal conductivity than conventional resin compositions. However, performance improvement and down-sizing of electronic components are rapidly advancing day by day, and there is thus an increasing demand for a resin composition showing even higher thermal conductivity. In addition, in resin compositions used in semiconductor packages and substrate materials, since the temperature range in which these resin compositions are used is becoming high, they are required to have heat resistance, for example, a higher glass transition temperature (Tg).

The present invention was made in view of such circumstances and an object of the present invention is to provide a phenolic resin composition which shows excellent post-curing thermal conductivity and has a high glass transition temperature (Tg).

Solution to Problem

The present inventors intensively studied the above-described problems and discovered that these problems can be solved by using a phenolic resin composition which contains a hydroxybenzene derivative having three or more hydroxy groups and a phenol resin having a xanthene derivative structure in the main chain as constituents of an epoxy resin curing agent, thereby completing the present invention.

Concrete means for solving the above-described problems are as described below.

<1> A phenolic resin composition, containing: an epoxy resin curing agent that contains a hydroxybenzene derivative represented by the following Formula (I) and a phenol resin having at least one partial structure selected from the group consisting of the following Formulae (IIa), (IIb), (IIc) and (IId); and an epoxy resin:

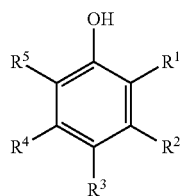
(I)

wherein each of $R^1$, $R^2$, $R^3$, $R^4$ and $R^5$ independently represents a hydroxy group, a hydrogen atom, or an alkyl group having from 1 to 8 carbon atoms; and at least two of $R^1$, $R^2$, $R^3$, $R^4$ and $R^5$ are hydroxy groups;

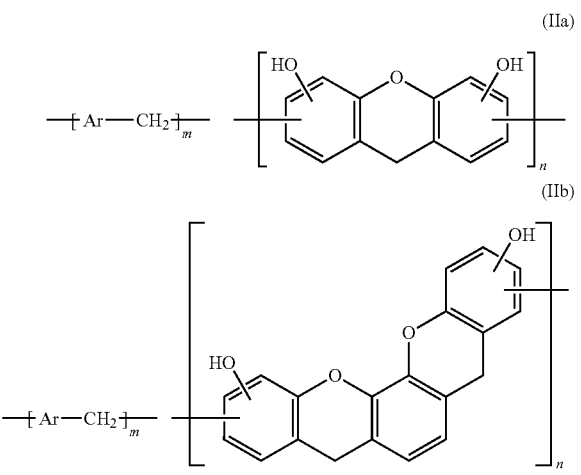

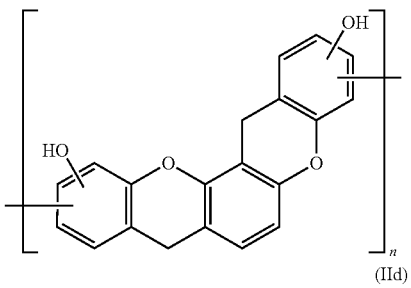

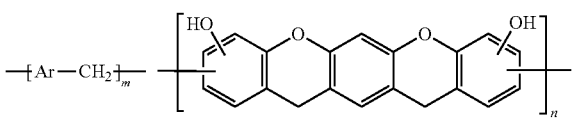

wherein each of m and n independently represents a positive number; and each Ar independently represents at least one group selected from the group consisting of the following Formulae (IIIa) and (IIIb); and

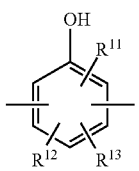
(IIIa)

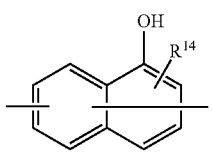
(IIIb)

wherein $R^{11}$ represents a hydrogen atom or a hydroxy group; each of $R^{12}$ and $R^{13}$ independently represents a hydrogen atom or an alkyl group having from 1 to 8 carbon atoms; and $R^{14}$ represents a hydrogen atom or a hydroxy group.

<2> The phenolic resin composition according to <1>, wherein a content of the hydroxybenzene derivative is from 5% by mass to 95% by mass with respect to a total mass of the epoxy resin curing agent.

<3> The phenolic resin composition according to <1> or <2>, wherein two of $R^1$, $R^2$, $R^3$, $R^4$ and $R^5$ in Formula (I) are hydroxy groups.

<4> The phenolic resin composition according to <3>, wherein $R^2$ and $R^4$ in Formula (I) are hydroxy groups.

<5> The phenolic resin composition according to <3>, wherein $R^1$ and $R^3$ in Formula (I) are hydroxy groups.

<6> The phenolic resin composition according to any one of <1> to <5>, wherein a mass ratio of a content of the phenol resin with respect to a content of the hydroxybenzene derivative (phenol resin/hydroxybenzene derivative) is from 50/50 to 80/20.

<7> The phenolic resin composition according to any one of <1> to <6>, wherein the epoxy resin has an epoxy equivalent weight of from 100 to 300.

<8> The phenolic resin composition according to any one of <1> to <7>, wherein the epoxy resin has a partial structure represented by the following Formula (IV):

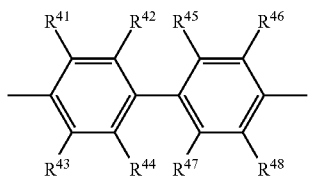

(IV)

wherein each of $R^{41}$, $R^{42}$, $R^{43}$, $R^{44}$, $R^{45}$, $R^{46}$, $R^{47}$ and $R^{48}$ independently represents a hydrogen atom, a hydrocarbon group having from 1 to 10 carbon atoms, or an alkoxy group having from 1 to 10 carbon atoms.

<9> The phenolic resin composition according to <8>, wherein the epoxy resin having the partial structure represented by Formula (IV) is a compound represented by the following Formula (V):

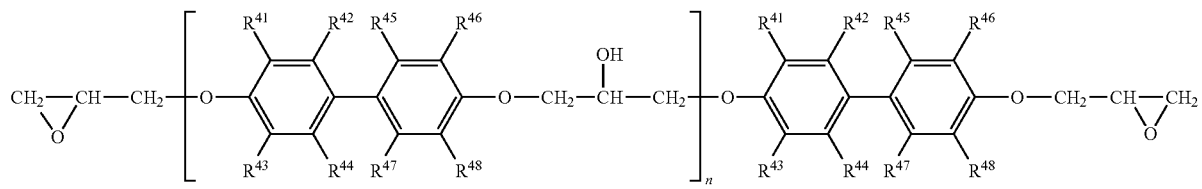

(V)

wherein each of $R^{41}$, $R^{42}$, $R^{43}$, $R^{44}$, $R^{45}$, $R^{46}$, $R^{47}$ and $R^{48}$ independently represents a hydrogen atom or a hydrocarbon group having from 1 to 10 carbon atoms; and n represents an integer from 0 to 3.

<10> The phenolic resin composition according to any one of <1> to <9>, further containing an inorganic filler.

<11> The phenolic resin composition according to any one of <1> to <10>, which is used as a heat conductive material for an electric component.

Advantageous Effects of Invention

According to the present invention, a phenolic resin composition which shows excellent post-curing thermal conductivity and has a high glass transition temperature (Tg) can be provided.

BRIEF DESCRIPTION OF DRAWINGS

FIG. 1 is a graph showing one example of the changes in the weight-average molecular weight of a phenol resin in the synthesis reaction of a curing agent 4 according to this embodiment.

FIG. 2 is a graph showing one example of the changes in the number of molecular nuclei (content) of a phenol resin in the synthesis reaction of the curing agent 4 according to this embodiment.

FIG. 3 is a graph showing one example of GPC chart of the phenol resin of the curing agent 4 according to this embodiment.

FIG. 4 is graph showing one example of FD-MS spectrum chart of the phenol resin of the curing agent 4 according to this embodiment.

DESCRIPTION OF EMBODIMENTS

In the present specification, those numerical ranges that are stated with "to" each denote a range that includes the numerical values stated before and after "to" as the minimum and maximum values, respectively. Further, when reference is made to the amount of a component contained in a composition, in cases where the composition contains plural substances corresponding to the component, unless otherwise specified, the indicated amount means the total amount of the plural substances present in the composition.

<Phenolic Resin Composition>

The phenolic resin composition of the invention contains (A) an epoxy resin curing agent which contains a hydroxybenzene derivative represented by the following Formula (I) and a phenol resin having at least one partial structure selected from the group consisting of the following Formulae (IIa), (IIb), (IIc) and (IId) (hereinafter, also referred to as "specific phenol resin"); and (B) an epoxy resin. If necessary, the phenolic resin composition may further contain at least one selected from the group consisting of fillers and other components.

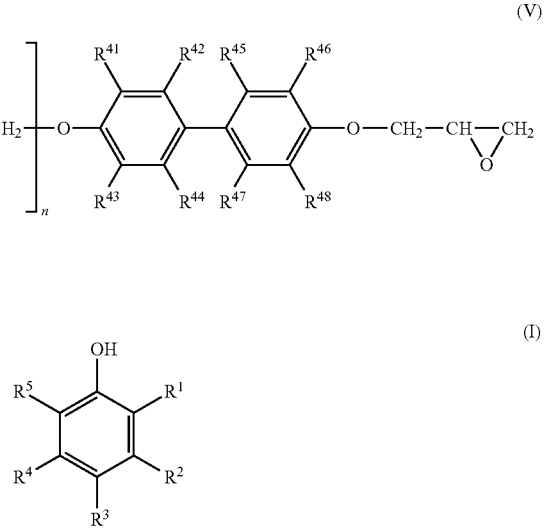

(I)

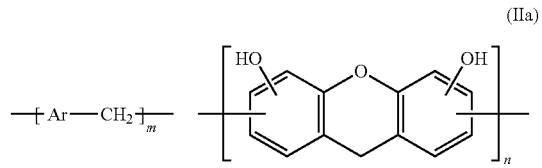

(IIa)

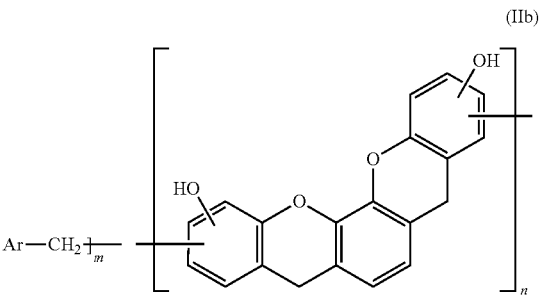

(IIb)

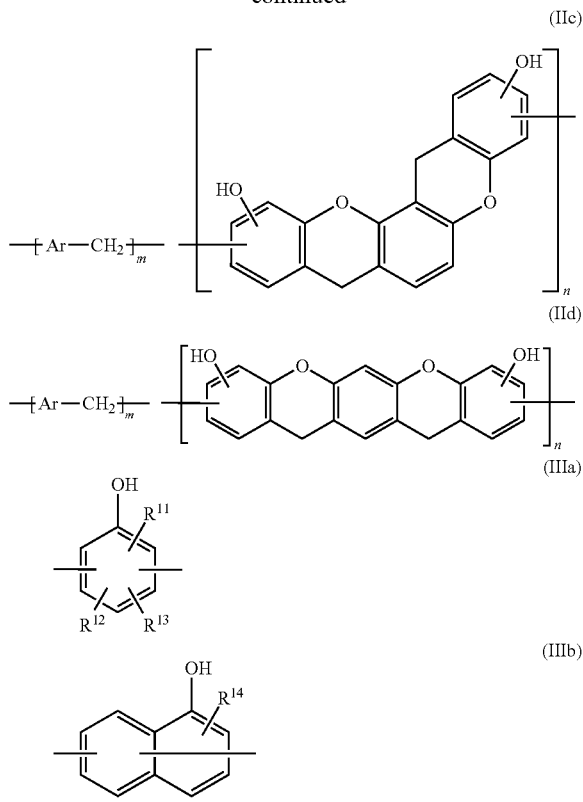

In Formula (I), each of $R^1$, $R^2$, $R^3$, $R^4$ and $R^5$ independently represents a hydroxy group, a hydrogen atom, or an alkyl group having from 1 to 8 carbon atoms; and at least two of $R^1$, $R^2$, $R^3$, $R^4$ and $R^5$ are hydroxy groups.

In Formulae (IIa), (IIb), (IIc) and (IId), each of m and n independently is a positive number that represents the number of each structural unit contained in the specific phenol resin, and each Ar independently represents at least one group selected from the group consisting of Formulae (IIIa) and (IIIb).

In Formula (IIIa), $R^{11}$ represents a hydrogen atom or a hydroxy group; each of $R^{12}$ and $R^{13}$ independently represents a hydrogen atom or an alkyl group having from 1 to 8 carbon atoms.

In Formula (IIIb), $R^{14}$ represents a hydrogen atom or a hydroxy group.

In the phenolic resin composition of the invention, because the epoxy resin curing agent contained therein contains the (A) hydroxybenzene derivative represented by Formula (I) and the phenol resin having at least one partial structure selected from the group consisting of Formulae (IIa), (IIb), (IIc) and (IId), excellent post-curing thermal conductivity and a high glass transition temperature (Tg) can be attained. It is thought that these effects are exerted because, for example, curing of a resin composition that contains a specific phenol resin along with a hydroxybenzene derivative having a specific structure results in the formation of a cured product having a high cross-linking density in which intramolecular orientation is appropriately controlled.

(A) Epoxy Resin Curing Agent

The epoxy resin curing agent of the invention contains at least one hydroxybenzene derivative represented by Formula (I) and at least one phenol resin having at least one partial structure selected from the group consisting of Formulae (IIa), (IIb), (IIc) and (IId) (specific phenol resin). If necessary, in addition to the hydroxybenzene derivative and the specific phenol resin, the epoxy resin curing agent of the invention may further contain other curing agent.

The hydroxybenzene derivative represented by Formula (I) is not particularly restricted as long as at least two of $R^1$, $R^2$, $R^3$, $R^4$ and $R^5$ in Formula (I) are hydroxy groups. The hydroxybenzene derivative represented by Formula (I) may be any of a trihydroxybenzene derivative in which two of $R^1$, $R^2$, $R^3$, $R^4$ and $R^5$ are hydroxy groups, a tetrahydroxybenzene derivative in which three of $R^1$, $R^2$, $R^3$, $R^4$ and $R^5$ are hydroxy groups, a pentahydroxybenzene derivative in which four of $R^1$, $R^2$, $R^3$, $R^4$ and $R^5$ are hydroxy groups, and hexahydroxybenzene in which all of $R^1$, $R^2$, $R^3$, $R^4$ and $R^5$ are hydroxy groups. Thereamong, from the standpoints of the post-curing thermal conductivity and the glass transition temperature (Tg) of the phenolic resin composition, the hydroxybenzene derivative represented by Formula (I) is preferably a trihydroxybenzene derivative in which two of $R^1$, $R^2$, $R^3$, $R^4$ and $R^5$ are hydroxy groups.

In cases where two of $R^1$, $R^2$, $R^3$, $R^4$ and $R^5$ are hydroxy groups in the hydroxybenzene derivative represented by Formula (I), the binding positions of the hydroxy groups are not particularly restricted. In cases where two of $R^1$, $R^2$, $R^3$, $R^4$ and $R^5$ are hydroxy groups, the binding positions of the hydroxy groups may be, for example, $R^1$ and $R^2$, $R^1$ and $R^3$, or $R^2$ and $R^4$. Further, in cases where three of $R^1$, $R^2$, $R^3$, $R^4$ and $R^5$ are hydroxy groups in the hydroxybenzene derivative represented by Formula (I), the binding positions of the hydroxy groups are not particularly restricted. In cases where three of $R^1$, $R^2$, $R^3$, $R^4$ and $R^5$ are hydroxy groups, the binding positions of the hydroxy groups may be, for example, $R^1$, $R^2$ and $R^3$; $R^1$, $R^3$ and $R^4$; or $R^1$, $R^3$ and $R^5$.

In cases where $R^1$, $R^2$, $R^3$, $R^4$ and $R^5$ in Formula (I) are not hydroxy groups, $R^1$, $R^2$, $R^3$, $R^4$ and $R^5$ each represent a hydrogen atom or an alkyl group having from 1 to 8 carbon atoms. In this case, from the standpoints of the post-curing thermal conductivity and the glass transition temperature (Tg) of the phenolic resin composition, $R^1$, $R^2$, $R^3$, $R^4$ and $R^5$ are each preferably a hydrogen atom or an alkyl group having from 1 to 4 carbon atoms, more preferably a hydrogen atom or an alkyl group having from 1 to 2 carbon atoms, still more preferably a hydrogen atom.

The hydroxy equivalent of the hydroxybenzene derivative represented by Formula (I) is not particularly restricted. From the standpoint of forming a high cross-linking density that contributes to a high thermal conductivity and a high Tg, the hydroxy equivalent is preferably 50 or less, more preferably 42 or less. The lower limit value of the hydroxy equivalent is also not particularly restricted and it is, for example, 29.

The melting point of the hydroxybenzene derivative represented by Formula (I) is not particularly restricted. From the standpoint of the workability thereof in the preparation of the phenolic resin composition, the melting point is preferably 80° C. to 300° C., more preferably 80° C. to 230° C.

Specific examples of the hydroxybenzene derivative represented by Formula (I) include 1,2,3-trihydroxybenzene (pyrogallol), 1,2,4-trihydroxybenzene (hydroxyhydroquinone), 1,3,5-trihydroxybenzene (phloroglucinol), 1,2,3,4-tetrahydroxybenzene, 1,2,3,5-tetrahydroxybenzene, 1,2,4,5-tetrahydroxybenzene, 1,2,3,4,5-pentahydroxybenzene and hexahydroxybenzene. Thereamong, from the standpoints of the post-curing thermal conductivity and the glass transition temperature (Tg) of the phenolic resin composition, the hydroxybenzene derivative represented by Formula (I) is preferably at least one selected from the group consisting of 1,2,3-trihydroxybenzene, 1,2,4-trihydroxybenzene and 1,3,5-trihydroxybenzene.

These hydroxybenzene derivatives represented by Formula (I) may be used singly, or in combination of two or more thereof.

In the epoxy resin curing agent of the invention, the content of the hydroxybenzene derivative represented by Formula (I) is preferably from 5% by mass to 95% by mass, more preferably from 10% by mass to 80% by mass, with respect to the total mass of the epoxy resin curing agent. When the content of the hydroxybenzene derivative is 5% by mass or higher, the post-curing thermal conductivity of the phenolic resin composition tends to be improved more effectively. Meanwhile, when the content of the hydroxybenzene derivative is 95% by mass or less, a phenolic resin composition showing a higher glass transition temperature tends to be obtained.

The epoxy resin curing agent of the invention contains, in addition to the hydroxybenzene derivative represented by Formula (I), at least one phenol resin having at least one partial structure selected from the group consisting of Formulae (IIa), (IIb), (IIc) and (IId) (specific phenol resin). Such phenol resins having at least one partial structure selected from the group consisting of Formulae (IIa), (IIb), (IIc) and (IId) (specific phenol resins) can be produced in a batch by the below-described production method, or can be produced as a mixture of compounds having at least two partial structures selected from the group consisting of Formulae (IIa), (IIb), (IIc) and (IId). That is, the specific phenol resin may contain a compound having only one partial structure represented by any one Formula selected from the group consisting of Formulae (IIa), (IIb), (IIc) and (IId), or may contain a compound having at least two partial structures selected from the group consisting of Formulae (IIa), (IIb), (IIc) and (IId).

In Formulae (IIa), (IIb), (IIc) and (IId), the binding positions of the hydroxy groups are not particularly restricted as long as they are on an aromatic ring. The Ars existing in each of Formulae (IIa), (IIb), (IIc) and (IId) may all be the same atomic group, or may contain two or more atomic groups. The at least one partial structure selected from the group consisting of Formulae (IIa), (IIb), (IIc) and (IId) may be contained as a main chain skeleton of the specific phenol resin, or as a part of a side chain. Further, each structural unit constituting the at least one partial structure selected from the group consisting of Formulae (IIa), (IIb), (IIc) and (IId) may be contained randomly or regularly, or in a block form.

In the at least one partial structure selected from the group consisting of Formulae (IIa), (IIb), (IIc) and (IId), the Ar represents at least one group selected from the group consisting of the above-described Formulae (IIIa) and (IIIb).

Each of $R^{11}$ in Formula (IIIa) and $R^{14}$ in Formula (IIIb) independently represents a hydrogen atom or a hydroxy group and, from the standpoint of the post-curing thermal conductivity of the phenolic resin composition, $R^{11}$ and $R^{14}$ are preferably hydroxy groups. The binding position of $R^{11}$ in Formula (IIIa) and that of $R^{14}$ in Formula (IIIb) are not particularly restricted.

Further, each of $R^{12}$ and $R^{13}$ in Formula (IIIa) independently represents a hydrogen atom or an alkyl group having from 1 to 8 carbon atoms. Examples of the alkyl group having from 1 to 8 carbon atoms which is represented by $R^{12}$ and $R^{13}$ in Formula (IIIa) include a methyl group, an ethyl group, a propyl group, an isopropyl group, a butyl group, an isobutyl group, a t-butyl group, a pentyl group, a hexyl group, a heptyl group and an octyl group. The binding positions of $R^{12}$ and $R^{13}$ in Formula (IIIa) are not particularly restricted.

From the standpoint of achieving the effects of the invention, particularly excellent thermal conductivity, each Ar in Formulae (IIa), (IIb), (IIc) and (IId) is preferably at least one selected from the group consisting of groups derived from dihydroxybenzene (groups represented by Formula (IIIa) in which $R^{11}$ is a hydroxy group; and $R^{12}$ and $R^{13}$ are hydrogen atoms) and groups derived from dihydroxynaphthalene (groups represented by Formula (IIIb) in which $R^{14}$ is a hydroxy group).

The term "groups derived from dihydroxybenzene" used herein refers to divalent groups that are formed by removing two hydrogen atoms from the aromatic ring moiety of dihydroxybenzene, and the positions from which the hydrogen atoms are removed are not particularly restricted. The term "groups derived from dihydroxynaphthalene" and the like also have comparable meanings.

From the standpoints of the productivity and the fluidity of the phenolic resin composition, the Ar in Formulae (IIa), (IIb), (IIc) and (IId) is more preferably a group derived from dihydroxybenzene, still more preferably at least one selected from the group consisting of groups derived from 1,2-dihydroxybenzene (catechol) and groups derived from 1,3-dihydroxybenzene (resorcinol).

With regard to m and n in Formulae (IIa), (IIb), (IIc) and (IId), from the standpoint of the fluidity of the phenolic resin composition, the ratio of m and n, m/n, is preferably from 1/5 to 20/1, more preferably from 1/3 to 10/1, still more preferably from 1/2 to 5/1. In addition, from the standpoint of the fluidity of the phenolic resin composition, the value of (m+n) is preferably 20 or less, more preferably 15 or less, still more preferably 10 or less. The lower limit value of (m+n) is not particularly restricted as long as it is not less than 2.

When m/n is 20/1 or less or (m+n) is 20 or less, an increase in the viscosity of the specific phenol resin can be suppressed, so that the phenolic resin composition tends to have more favorable fluidity. Meanwhile, when m/n is 1/5 or greater, the post-curing thermal conductivity of the phenolic resin composition tends to be further improved.

In the specific phenol resin having at least one partial structure selected from the group consisting of Formulae (IIa), (IIb), (IIc) and (IId), particularly when Ar is at least any one of groups derived from a substituted or unsubstituted dihydroxybenzene and groups derived from a substituted or unsubstituted dihydroxynaphthalene, the specific phenol resin can be more easily synthesized as compared to, for example, phenol resins in which these compounds are simply converted into novolac, and a phenol resin having a low softening point tends to be obtained. Therefore, a phenolic resin composition containing such a specific phenol resin has advantages in that, for example, the production and handling thereof are easy.

In such a phenol resin having at least one partial structure selected from the group consisting of Formulae (IIa), (IIb), (IIc) and (IId), the partial structure can be easily determined as a fragment component of the phenol resin by field desorption ionization mass-spectrometry (FD-MS).

The molecular weight of the specific phenol resin is not particularly restricted. From the standpoint of the fluidity of the phenolic resin composition, the number-average molecular weight of the specific phenol resin is preferably 2,000 or less, more preferably 1,500 or less, still more preferably from 350 to 1,500.

Further, the weight-average molecular weight of the specific phenol resin is preferably 2,000 or less, more preferably 1,500 or less, still more preferably from 400 to 1,500.

The number-average molecular weight and the weight-average molecular weight of the specific phenol resin are each measured by a conventional method using GPC.

The hydroxy equivalent of the specific phenol resin is not particularly restricted. From the standpoint of the cross-linking density relating to heat resistance, the hydroxy equivalent of the specific phenol resin is, in terms of average value, preferably from 60 to 130, more preferably from 65 to 120, still more preferably from 70 to 110.

The melting point or the softening point of the specific phenol resin is not particularly restricted. From the standpoints of the productivity and the fluidity of the phenolic resin composition, the melting point or the softening point of the specific phenol resin is preferably from 40° C. to 120° C., more preferably from 50° C. to 100° C.

The method of producing the specific phenol resin having at least one partial structure selected from the group consisting of Formulae (IIa), (IIb), (IIc) and (IId) is not particularly restricted. As the method of producing the specific phenol resin, for example, the following method using an intramolecular ring cyclization reaction by dehydration of a dihydroxyarene can be utilized. That is, the specific phenol resin can be produced by, in the same manner as in the case of an ordinary novolac resin, allowing a phenol containing from 20% by mol to 90% by mol of catechol (1,2-dihydroxybenzene; a compound represented by Formula (IIIa) in which $R^{11}$ is a hydroxy group and $R^{12}$ and $R^{13}$ are hydrogen atoms) or the like to react with an aldehyde in the presence of an acid catalyst such as oxalic acid.

The reaction conditions can be selected as appropriate in accordance with the structure and the like of the specific phenol resin to be obtained. For example, in cases where formaldehyde is used as the aldehyde, the reaction is carried out under reflux condition at about 100° C. This reflux reaction is carried out for from 1 hour to 8 hours, and the resultant is subsequently heated to 120° C. to 180° C. while removing water from the reaction system by a conventional method. It is preferred that this process is carried out in an oxidizing atmosphere (for example, in an air current). Thereafter, by maintaining this condition for from 2 hours to 24 hours, a compound having at least one partial structure selected from the group consisting of Formulae (IIa) and (IIb) is generated in the system, whereby a desired specific phenol resin can be obtained.

In the intramolecular ring cyclization reaction by dehydration of a dihydroxyarene, by allowing resorcinol, catechol and an aldehyde to react in the same manner, a mixture of compounds having at least one partial structure selected from the group consisting of Formulae (IIa), (IIb), (IIc) and (IId) is produced. Further, by allowing resorcinol and an aldehyde to react in the same manner, a mixture of compounds having at least one partial structure selected from the group consisting of Formulae (IIa), (IIc) and (IId) is produced. Still further, by allowing hydroquinone, catechol and an aldehyde in the same manner, a mixture of compounds having at least one partial structure selected from the group consisting of Formulae (IIa) and (IIb) is produced.

From a different standpoint, the above-described specific phenol resin is a phenol resin which is obtained by a reaction between a dihydroxyarene and an aldehyde in the presence of an acid catalyst and has a hydroxy equivalent higher than the theoretical hydroxy equivalent of a novolac resin of a dihydroxyarene (for example, about 60 when a dihydroxybenzene is used). In the present invention, it is believed that, since the epoxy resin curing agent contains such a phenol resin, the orientation of the epoxy resin is facilitated and an effect that the thermal conductivity of the phenolic resin composition is increased is consequently obtained. The reason why the hydroxy equivalent of the specific phenol resin is higher than the theoretical value is believed to be because the specific phenol resin has such partial structures of Formulae (IIa), (IIb), (IIc) and (IId) that are produced by an intramolecular ring cyclization reaction in the reaction of a dihydroxyarene.

Examples of the dihydroxyarene used in the production of the specific phenol resin include monocyclic dihydroxyarenes such as catechol, resorcinol and hydroquinone; and polycyclic dihydroxyarenes, for example, dihydroxynaphthalene such as 1,5-dihydroxynaphthalene, 1,6-dihydroxynaphthalene and 1,4-dihydroxynaphthalene. These dihydroxyarenes may be used singly, or in combination of two or more thereof.

Further, examples of the aldehyde include those aldehydes that are normally used in the synthesis of a phenol resin, such as formaldehyde, acetaldehyde, benzaldehyde and salicylaldehyde. These aldehydes may be used singly, or in combination of two or more thereof.

The reaction between these dihydroxyarene and aldehyde is carried out in the presence of an acid catalyst using the aldehyde in an amount of preferably from 0.3 mol to 0.9 mol, more preferably from 0.4 mol to 0.8 mol, with respect to 1 mol of the dihydroxyarene.

By using 0.3 mol or more of the aldehyde, the content of a dibenzoxanthene derivative can be increased and the amount of unreacted dihydroxyarene can be reduced, so that the amount of produced specific phenol resin tends to be increased. Meanwhile, when the amount of the aldehyde is 0.9 mol or less, gelation in the reaction system is inhibited, so that the reaction tends to be easily controllable.

Examples of an acid used as the acid catalyst include organic acids such as oxalic acid, acetic acid, p-toluenesulfonic acid, trifluoroacetic acid, trifluoromethanesulfonic acid and methanesulfonic acid; and inorganic acids such as hydrochloric acid, sulfuric acid and phosphoric acid. These acid catalysts may be used singly, or in combination of two or more thereof.

The amount of the acid catalyst to be used is, for example, preferably from 0.0001 mol to 0.1 mol, more preferably from 0.001 mol to 0.05 mol, with respect to 1 mol of the dihydroxyarene used. When the acid catalyst is used in an amount of 0.0001 mol or more, the step of performing intramolecular dehydration and ring cyclization at 120° C. to 180° C. tends to be done in a short time. Meanwhile, when the acid catalyst is used in an amount of 0.1 mol or less, the step of removing the catalyst tends to be easily carried out, so that application to a system such as semiconductors and the like where ionic impurities are disfavored is facilitated.

The specific phenol resin may also contain a monomer that is a phenolic compound constituting the specific phenol resin. The content of the monomer that is a phenolic compound constituting the specific phenol resin (hereinafter, may also be referred to as "monomer content") is not particularly restricted; however, it is preferably from 5% by mass to 80% by mass, more preferably from 15% by mass to 60% by mass, still more preferably from 20% by mass to 50% by mass, with respect to the total mass of the specific phenol resin.

When the monomer content is 20% by mass or more, an increase in the viscosity of the specific phenol resin is suppressed and the adhesion with the below-described filler is further improved. Meanwhile, when the monomer content is 50% by mass or less, a high-dimensional structure having a higher density is formed by cross-linking reaction in curing, so that excellent thermal conductivity and excellent heat resistance can be achieved.

The content of the specific phenol resin in the epoxy resin curing agent is, preferably from 5% by mass to 95% by mass, more preferably from 20% by mass to 90% by mass, still more preferably from 50% by mass to 80% by mass, with respect to the total mass of the epoxy resin curing agent. When the content of the specific phenol resin in the epoxy resin curing agent is 5% by mass or more, a higher glass transition temperature tends to be obtained. Meanwhile, when the content is 95% by mass or less, the thermal conductivity tends to be improved more effectively.

In the epoxy resin curing agent, the content ratio of the hydroxybenzene derivative and the specific phenol resin is not particularly restricted. For example, from the standpoints of the thermal conductivity and formation of a high cross-linking density, the mass ratio of the content of the specific phenol resin with respect to the content of the hydroxybenzene derivative (specific phenol resin/hydroxybenzene derivative) is preferably from 5/95 to 95/5, more preferably from 20/80 to 95/5, still more preferably from 40/60 to 85/15.

In addition to the hydroxybenzene derivative and the specific phenol resin, the epoxy resin curing agent may further contain other curing agent in such a range that does not adversely affect the effects of the invention. This other curing agent can be selected as appropriate from those curing agents that are normally used in, for example, an epoxy resin composition for sealing or adhesion. Specific examples of other curing agent include phenols such as phenol, cresol, resorcin, catechol, bisphenol A, bisphenol F, phenylphenol and aminophenol; naphthols such as α-naphthol, β-naphthol and dihydroxynaphthalene; novolac-type phenol resins that are obtained by condensation or co-condensation of at least one selected from the group consisting of the above-described phenols and naphthols with a compound having an aldehyde group, such as formaldehyde, benzaldehyde or salicylaldehyde, in the presence of an acid catalyst; dicyclopentadiene-type phenol resins that are synthesized by copolymerization of at least one selected from the group consisting of phenols and naphthols and a cyclopentadiene, such as dicyclopentadiene-type phenol-novolac resins and dicyclopentadiene-type naphthol-novolac resins; terpene-modified phenol resins; and triphenol methane-type phenol resins.

The content of other curing agent in the epoxy resin composition is not particularly restricted as long as the effects of the invention are not adversely affected. For example, from the standpoint of the thermal conductivity, the content of other curing agent is preferably 20% by mass or less, more preferably 10% by mass or less, with respect to the total mass of the epoxy resin curing agent.

(B) Epoxy Resin

The phenolic resin composition of the invention contains at least one epoxy resin. The epoxy resin is not particularly restricted and can be selected as appropriate from those epoxy resins that are normally used in, for example, an epoxy resin composition for sealing or adhesion. The phenolic resin composition of the invention preferably contains at least one epoxy resin having a partial structure represented by the following Formula (IV). By allowing the epoxy resin to have a partial structure represented by Formula (IV), when the phenolic resin composition is cured, a high-dimensional structure with high order can be formed. As a result, excellent thermal conductivity can be realized.

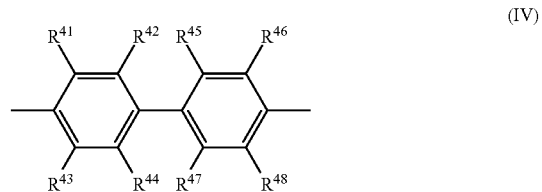

(IV)

In Formula (IV), each of $R^{41}$, $R^{42}$, $R^{43}$, $R^{44}$, $R^{45}$, $R^{46}$, $R^{47}$ and $R^{48}$ independently represents a hydrogen atom, a hydrocarbon group having from 1 to 10 carbon atoms, or an alkoxy group having from 1 to 10 carbon atoms. The hydrocarbon group having from 1 to 10 carbon atoms is preferably a saturated or unsaturated hydrocarbon group which is optionally substituted. Examples of the hydrocarbon group having from 1 to 10 carbon atoms include a methyl group, an ethyl group, a propyl group, an isopropyl group, a butyl group, an isobutyl group, a t-butyl group, a pentyl group, a hexyl group, a heptyl group, an octyl group, a nonyl group, a decanyl group and a vinyl group and, from the standpoint of the orientation of the epoxy resin, alkyl groups having from 1 to 3 carbon atoms are preferred. Examples of the alkoxy group having from 1 to 10 carbon atoms include a methoxy group, an ethoxy group, a propoxy group, an isopropoxy group, a butoxy group, an isobutoxy group and a t-butoxy group and, from the standpoint of the orientation of the epoxy resin, alkoxy groups having from 1 to 3 carbon atoms are preferred.

Thereamong, each of $R^{41}$, $R^{42}$, $R^{43}$, $R^{44}$, $R^{45}$, $R^{46}$, $R^{47}$ and $R^{48}$ in Formula (IV) independently is preferably a hydrogen atom or an alkyl group having from 1 to 3 carbon atoms, more preferably a hydrogen atom or a methyl group.

The epoxy resin having a partial structure represented by Formula (IV) may take a planar structure in which the two benzene rings constituting a biphenyl structure are in a slightly distorted state. Therefore, the epoxy resin having a partial structure represented by Formula (IV) is characterized in that, as compared to an epoxy resin having no biphenyl structure, the resin skeleton is more easily oriented in the z-axis direction (the direction perpendicular to the benzene ring plane). Such a characteristic is believed to be advantageous in reducing the thermal resistance of a cured product of epoxy resin composition and to, as a result, improve the heat dissipation of the cured product and impart the cured product with high thermal conductivity.

The epoxy equivalent weight of the above-described epoxy resin is not particularly restricted. For example, from the standpoint of the thermal conductivity, the epoxy equivalent weight of the epoxy resin is, in terms of average value, preferably from 100 to 300, more preferably from 150 to 250.

The melting point or the softening point of the epoxy resin is also not particularly restricted. For example, from the standpoints of the productivity and the fluidity of the phenolic resin composition, the melting point or the softening point of the epoxy resin is preferably from 50° C. to 150° C., more preferably from 75° C. to 140° C.

Examples of the epoxy resin having a partial structure represented by Formula (IV) include biphenyl-type epoxy resins and biphenylene-type epoxy resins, specifically compounds represented by the following Formula (V).

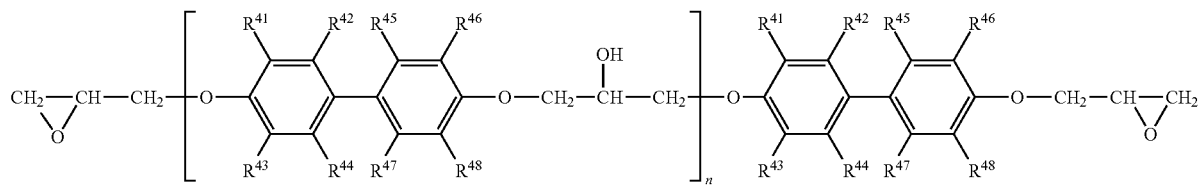

(V)

In Formula (V), each of $R^{41}$, $R^{42}$, $R^{43}$, $R^{44}$, $R^{45}$, $R^{46}$, $R^{47}$ and $R^{48}$ independently represents a hydrogen atom or a substituted or unsubstituted hydrocarbon group having from 1 to 10 carbon atoms, and n represents an integer from 0 to 3. From the standpoint of the fluidity, n is preferably from 0 to 2, more preferably 0 or 1, still more preferably 0. Examples of the substituted or unsubstituted hydrocarbon group having from 1 to 10 carbon atoms include a methyl group, an ethyl group, a propyl group, a butyl group, an isopropyl group and an isobutyl group.

From the standpoint of the thermal conductivity, it is preferred that each of $R^{41}$, $R^{42}$, $R^{43}$, $R^{44}$, $R^{45}$, $R^{46}$, $R^{47}$ and $R^{48}$ in Formula (V) independently is a hydrogen atom or a methyl group.

Examples of the biphenyl-type epoxy resins represented by Formula (V) include epoxy resins containing 4,4'-bis(2,3-epoxypropoxy)biphenyl or 4,4'-bis(2,3-epoxypropoxy)-3,3',5,5'-tetramethylbiphenyl as a main component; and epoxy resins obtained by reaction between epichlorohydrin and 4,4'-biphenol or 4,4'-(3,3',5,5'-tetramethyl)biphenol.

Thereamong, as a biphenyl-type epoxy resin represented by Formula (V), from the standpoint of enabling to prevent a reduction in the glass transition temperature of a cured product of the phenolic resin composition, an epoxy resin containing 4,4'-bis(2,3-epoxypropoxy)-3,3',5,5'-tetramethylbiphenyl as a main component is preferred.

Examples of epoxy resins that are represented by Formula (V) and available in the market include "EPIKOTE YX4000H" (trade name, manufactured by Mitsubishi Chemical Corporation), which contains, as a main component, a compound in which $R^{41}$, $R^{43}$, $R^{46}$ and $R^{48}$ are methyl groups, $R^{42}$, $R^{44}$, $R^{45}$ and $R^{47}$ are hydrogen atoms and n=0; and "EPIKOTE YL6121H" (trade name, manufactured by Mitsubishi Chemical Corporation), which is a mixture of a compound in which $R^{41}$, $R^{43}$, $R^{46}$ and $R^{48}$ are methyl groups, $R^{42}$, $R^{44}$, $R^{45}$ and $R^{47}$ are hydrogen atoms and n=0, and a compound in which $R^{41}$, $R^{42}$, $R^{43}$, $R^{44}$, $R^{45}$, $R^{46}$, $R^{47}$ and $R^{48}$ are hydrogen atoms and n=0.

In cases where the phenolic resin composition of the invention contains an epoxy resin having a partial structure represented by Formula (IV), the phenolic resin composition may also contain an epoxy resin other than the one having a partial structure represented by Formula (IV) in such a range that does not adversely affect the effects of the invention.

Examples of other epoxy resin include epoxidized novolac resins, such as phenol novolac-type epoxy resins and o-cresol novolac-type epoxy resins, which are obtained by condensation or co-condensation of a phenol (e.g., phenol, cresol, xylenol, resorcin, catechol, bisphenol A or bisphenol F) and/or a naphthol (e.g., α-naphthol, β-naphthol or dihydroxynaphthalene) with a compound having an aldehyde group (e.g., formaldehyde, acetaldehyde, propionaldehyde, benzaldehyde or salicylaldehyde) in the presence of an acid catalyst; diglycidyl ethers such as bisphenol A, bisphenol F, bisphenol S and bisphenol A/D; epoxidation products of phenol-aralkyl resins synthesized from a phenol and/or a naphthol and dimethoxy paraxylene or bis(methoxymethyl)biphenyl; stilbene-type epoxy resins; hydroquinone-type epoxy resins; glycidyl ester-type epoxy resins that are obtained by reaction between a polybasic acid, such as phthalic acid or dimer acid, and epichlorohydrin; glycidylamine-type epoxy resins that are obtained by reaction between a polyamine, such as diaminodiphenylmethane or isocyanuric acid, and epichlorohydrin; dicyclopentadiene-type epoxy resins, which are epoxidation products of co-condensation resins synthesized from a cyclopentadiene and a phenol; epoxidation products of dimers of hydroxynaphthalene and/or dihydroxynaphthalene; triphenolmethane-type epoxy resins; trimethylolpropane-type epoxy resins; terpene-modified epoxy resins; linear aliphatic epoxy resins obtained by oxidation of an olefin bond with a peracid such as peracetic acid; alicyclic epoxy resins; sulfur atom-containing epoxy resins; and these epoxy resins that are modified with silicone, acrylonitrile, butadiene, an isoprene-based rubber, a polyamide-based resin or the like. These other epoxy resins may be used singly, or in combination of two or more thereof.

The content of the above-described other epoxy resin with respect to the total solid content of the phenolic resin composition of the invention is not particularly restricted. In cases where the phenolic resin composition of the invention contains the above-described other epoxy resin, from the standpoints of the thermal conductivity and the electrical insulation as well as the flexibility of B-stage sheet, the content of other epoxy resin is preferably from 3% by mass to 10% by mass and, from the standpoint of the physical properties of the below-described cured product, it is more preferably from 4% by mass to 7% by mass. Here, the term "B-stage" is defined in JIS K 6900:1994. It is also noted here that the term "solid content" in the phenolic resin composition refers to the components constituting the phenolic resin composition that remain after removal of volatile component(s).

In the epoxy resin contained in the phenolic resin composition of the invention, the content of the epoxy resin having a partial structure represented by Formula (IV) is not particularly restricted. In cases where the phenolic resin composition of the invention contains an epoxy resin having a partial structure represented by Formula (IV), from the standpoint of the thermal conductivity, the content of the epoxy resin having a partial structure represented by Formula (IV) is, with respect to the whole epoxy resin, preferably not less than 60% by mass, more preferably not less than 70% by mass and, from the standpoint of further improving the thermal conductivity, it is still more preferably not less than 80% by mass.

Further, as for the content ratio of the above-described epoxy resin curing agent(s) and epoxy resin(s) in the phenolic resin composition, from the standpoints of the thermal conductivity and the electrical insulation as well as the flexibility and the serviceable life of B-stage sheet, the ratio of the total mass of the epoxy resin curing agent(s) with respect to the total mass of the epoxy resin(s) contained in the phenolic resin composition is, on an equivalent basis, preferably from 0.5 to 2.0, more preferably from 0.6 to 1.5 and, from the standpoints of the moldability and reliability, it is still more preferably from 0.8 to 1.2.

The term "on an equivalent basis" used herein means that the content ratio of the epoxy resin(s) and the epoxy resin curing agent(s) is defined based on the number of epoxy groups contained in the epoxy resin(s) and the number of hydroxy groups contained in the epoxy resin curing agent(s), which hydroxy groups react with the epoxy groups at a ratio of 1:1.

Accordingly, in cases where the epoxy resin curing agent contains only the hydroxybenzene derivative and the specific phenol resin, the above-described content ratio on an equivalent basis is calculated specifically by the following equation:

$$\text{Content ratio (epoxy resin curing agent/epoxy resin)} = \{\Sigma(\text{amount of hydroxybenzene derivative/hydroxy equivalent of hydroxybenzene derivative}) + \Sigma(\text{amount of specific phenol resin/hydroxy equivalent of specific phenol resin})\} / \Sigma(\text{amount of epoxy resin/epoxy equivalent weight of epoxy resin}) \quad (1)$$

(C) Filler

It is preferred that the phenolic resin composition of the invention further contains at least one filler. In the present invention, by incorporating a filler, such effects of increasing the thermal conductivity, reducing the hygroscopicity, reducing the coefficient of linear expansion and improving the strength can be obtained. The filler is not particularly restricted and can be selected as appropriate from those inorganic fillers having excellent insulating properties and high thermal conductivity. Examples of such inorganic fillers include silicas such as fused silica, crystalline silica and synthetic silica, alumina, zircon, calcium silicate, calcium carbonate, potassium titanate, silicon carbide, silicon nitride, aluminum nitride, boron nitride, beryllia, zirconia, forsterite, steatite, spinel, mullite and titania. The shapes of these inorganic fillers are not particularly restricted. These inorganic fillers may take any form of, for example, powder, beads obtained by spheroidization thereof, and fibers. These inorganic fillers may be used singly, or in combination of two or more thereof.

From the standpoint of improving the thermal conductivity of the phenolic resin composition, it is preferred that some or all of the inorganic fillers are at least one selected from the group consisting of crystalline silica, alumina, aluminum nitride, silicon nitride and boron nitride.

From the standpoint of improving the thermal conductivity of the phenolic resin composition, the average particle size of the inorganic fillers is preferably from 3 μm to 30 μm, more preferably from 5 μm to 20 μm.

Further, from the standpoint of attaining superior thermal conductivity, it is preferred that the inorganic fillers include at least two kinds of inorganic fillers having different average particle sizes. As the inorganic fillers, specifically, for example, it is more effective to use a combination of at least two components, which are a component (C1) having an average particle size of from 10 μm to 50 μm and a component (C2) having an average particle size of about from 0.5 μm to 3 μm.

The average particle size of the inorganic fillers is measured by a laser diffraction method and corresponds to the particle size at which the cumulative weight reaches 50% in a weight-cumulative particle size distribution curve drawn from the side of small particle size. The measurement of the particle size distribution using a laser diffraction method can be carried out using a laser diffraction-scattering particle size distribution analyzer (for example, LS230 manufactured by Beckman Coulter, Inc.).

From the standpoint of the fluidity, it is preferred that the inorganic fillers have a spherical shape or a shape analogous thereto. From the standpoint of the fluidity of the phenolic resin composition, along with the use of at least one selected from the group consisting of crystalline silica, spherical alumina, spherical aluminum nitride, spherical silicon nitride and spherical boron nitride as some of the inorganic fillers, it is preferred to use a spherical fused silica, a spherical synthetic silica and/or the like in combination. It is noted here that the term "crystalline silica" used above refers to a silica having a crystallization degree of 70% or higher.

In cases where the phenolic resin composition of the invention further contains a filler, the content thereof is not particularly restricted. In cases where the phenolic resin composition of the invention contains a filler, from the standpoints of the fluidity, reliability and the like of the phenolic resin composition, the content of the filler is preferably from 60% by mass to 97% by mass, more preferably from 65% by mass to 96% by mass, still more preferably from 70% by mass to 95% by mass, with respect to the total mass of solids contained in the phenolic resin composition. When the content of the filler is 60% by mass or more, the phenolic resin composition tends to show more favorable hygroscopic characteristics, mechanical strength and the like. Meanwhile, when the content of the filler is 97% by mass or less, the phenolic resin composition tends to show more favorable flow characteristics.

From the standpoint of the balance between the thermal conductivity and other reliabilities of the phenolic resin composition, in addition to controlling the content of all fillers in the above-described range, it is preferred to control the content of at least one inorganic filler selected from the group consisting of crystalline silica, alumina, aluminum nitride, silicon nitride and boron nitride to be not less than 10% by mass, more preferably not less than 20% by mass, still more preferably not less than 30% by mass, with respect to the mass of all fillers. When the content of the at least one inorganic filler selected from the group consisting of crystalline silica, alumina, aluminum nitride, silicon nitride and boron nitride is 10% by mass or more with respect to the mass of all fillers, the phenolic resin composition tends to show more favorable thermal conductivity after being cured.

(D) Other Additives

In addition to the above-described components (A) and (B) and the component (C) which is incorporated as required, the phenolic resin composition of the invention may further contain other additive(s) if necessary. Examples of other additives include curing accelerators, coupling agents, mold release agents and flame retardants.

It is preferred that the phenolic resin composition of the invention further contains at least one curing accelerator. In the present invention, by incorporating a curing accelerator, the productivity can be further improved. As the curing accelerator, those curing accelerators that are normally used in a phenolic resin composition can be used without any particular restriction. Examples of such curing accelerator include cycloamidine compounds such as 1,8-diaza-bicyclo[5.4.0]undecene-7, 1,5-diaza-bicyclo[4.3.0]nonene, 5,6-dibutylamino-1,8-diaza-bicyclo[5.4.0]undecene-7, and compounds having intramolecular polarization that are obtained by adding, to any of these cycloamidine compounds, a compound having a π bond such as maleic anhydride, a quinone compound (e.g., 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone or phenyl-1,4-benzoquinone), diazophenylmethane, or a phenol resin; tertiary amine compounds and derivatives thereof, such as benzyldimethylamine, triethanolamine, dimethylaminoethanol and tris(dimethylaminomethyl)phenol; imidazole compounds and derivatives thereof, such as 2-methylimidazole, 2-phenylimidazole and 2-phenyl-4-methylimidazole; organophosphines such as tributylphosphine, methyldiphenylphosphine, triphenylphosphine, tris(4-methylphenyl)phosphine, diphenylphosphine and phenylphosphine, and organophosphorus compounds such as compounds having intramolecular polarization that are obtained by adding, to any of these organophosphines, a compound having a π bond such as maleic anhydride, the above-described quinone compound, diazophenylmethane, or a phenol resin; and tetraphenyl boron salts and derivatives thereof, such as tetraphenylphosphonium tetraphenylborate, triphenylphosphine tetraphenylborate, 2-ethyl-4-methylimidazole tetraphenylborate and N-methylmorpholine tetraphenylborate. These curing accelerators may be used singly, or in combination of two or more thereof. From the standpoints of the reliability and the moldability, the curing accelerator(s) is/are preferably an organophosphorus compound(s).

In cases where the phenolic resin composition of the invention further contains a curing accelerator, the content thereof is not particularly restricted as long as it is an amount that achieves a curing accelerating effect. In cases where the phenolic resin composition of the invention contains a curing accelerator, the content thereof is preferably from 0.1% by mass to 10% by mass, more preferably from 1% by mass to 5% by mass, with respect to the total mass of the (B) epoxy resin. When the content of the curing accelerator is 0.1% by mass or more, excellent short-time curability tends to be attained. Meanwhile, when the content of the curing accelerator is 10% by mass or less, an excessively high curing rate is inhibited, so that a more favorable molded article tends to be obtained.

The phenolic resin composition of the invention may further contain at least one coupling agent. In the present invention, by incorporating a coupling agent, the adhesion of the resin component containing the epoxy resin and epoxy resin curing agent with the filler can be further improved.

Examples of the coupling agent include various silane coupling agents such as epoxysilane, mercaptosilane, aminosilane, alkylsilane, ureidosilane and vinylsilane; titanium compounds; aluminum chelates; and aluminum/zirconium compounds. These coupling agents may be used singly, or in combination of two or more thereof.

In cases where the phenolic resin composition of the invention contains a coupling agent, the content thereof is preferably from 0.05% by mass to 5% by mass, more preferably from 0.1% by mass to 2.5% by mass, with respect to the above-described (C) filler. When the content of the coupling agent is 0.05% by mass or more with respect to the (C) filler, the moisture resistance tends to be further improved. Meanwhile, when the content of the coupling agent is 5% by mass or less with respect to the (C) filler, the moldability tends to be further improved.

It is preferred that the phenolic resin composition of the invention further contains at least one mold release agent. In the present invention, by incorporating a mold release agent, when molding the phenolic resin composition, smoother release thereof from a die can be ensured. As the mold release agent, conventionally known mold release agents, for example, higher fatty acid-based waxes such as stearic acid and montanic acid, higher fatty acid ester-based waxes such as stearic acid esters and montanic acid esters, and polyethylene-based waxes, can be used.

In cases where the phenolic resin composition of the invention contains a mold release agent, the content thereof is, from the standpoint of the productivity of the phenolic resin composition, preferably from 0.05% by mass to 5% by mass, more preferably from 0.1% by mass to 2.5% by mass, with respect to the epoxy resin.

The phenolic resin composition of the invention may further contain at least one flame retardant. Examples of the flame retardant include conventionally known flame retardants, for example, halogen-based flame retardants such as brominated epoxy resins; antimony-based flame retardants such as antimony trioxide, antimony tetraoxide and antimony pentoxide; phosphorus-based flame retardants such as phosphates; and metal hydroxide-based flame retardants such as magnesium hydroxide and aluminum hydroxide.

If necessary, within such a range that does not adversely affect the effects of the invention, the phenolic resin composition of the invention may also contain, for example, a coloring agent such as a carbon black, an organic dye, an organic pigment, titanium oxide, red lead or red iron oxide; an adhesion promoter, such as imidazole, triazole, tetrazole or triazine or a derivative thereof, anthranilic acid, malonic acid, malic acid, maleic acid, aminophenol, quinoline or a derivative thereof, an aliphatic acid amide compound, a dithiocarbamate, or a thiadiazole derivative; a silicone-based or non-silicone-based stress-reducing agent.

The method of producing the phenolic resin composition of the invention is not particularly restricted as long as the constituting components can each be dispersed and mixed, and any method may be employed. One example of a common method for producing the phenolic resin composition of the invention is a method in which the raw materials are sufficiently mixed using a mixer or the like and the resulting mixture is then melt-kneaded using a mixing roll, a kneader, an extruder or the like, followed by cooling and pulverization. The phenolic resin composition of the invention can be made user-friendly by making it into a tablet having dimensions and mass that are suitable for molding conditions.

In addition, the phenolic resin composition of the invention may further contain an organic solvent. The phenolic resin composition containing an organic solvent can be used as a liquid resin composition. The phenolic resin composition of the invention can also be used in the form of a sheet or film obtained by thinly coating such liquid resin composition on a plate or a film and then evaporating the organic solvent under such a condition where curing reaction of the resin does not overly proceed.

The organic solvent is not particularly restricted and can be selected as appropriate from those organic solvents that are normally used.

(Use)

Since the phenolic resin composition of the invention contains an epoxy resin and an epoxy resin curing agent that contains a hydroxybenzene derivative represented by Formula (I) and a phenol resin having at least one partial structure selected from the group consisting of Formulae (IIa), (IIb), (IIc) and (IId), a semi-cured or cured product of the phenolic resin composition of the invention shows excellent thermal conductivity as well as a high glass transition temperature (Tg). Therefore, the phenolic resin composition of the invention can be suitably used as a heat conductive material of heat-dissipating electronic components (such as IC (integrated-circuit) chips and printed wiring boards) of various electrical and electronic devices. The term "heat conductive material" used herein means a material having high thermal conductivity that is used for efficiently dissipating heat from a heating element, and it is generally arranged between a heating element and a heat-dissipating material.

EXAMPLES

The present invention will now be described concretely by way of examples thereof; however, the present invention is not restricted thereto by any means. It is noted here that, unless otherwise specified, all "%" are by mass.

The details of the raw materials that were used in Examples and Comparative Examples are shown below.
(A) Epoxy Resin Curing Agents Curing agent 1: 1,2,3-trihydroxybenzene (a hydroxybenzene derivative represented by Formula (I): also referred to as "pyrogallol", manufactured by Wako Pure Chemical Industries, Ltd.)

Curing agent 2: 1,2,4-trihydroxybenzene (a hydroxybenzene derivative represented by Formula (I): also referred to as "hydroxyhydroquinone", manufactured by Tokyo Chemical Industry Co., Ltd.)

Curing agent 3: 1,3,5-trihydroxybenzene (a hydroxybenzene derivative represented by Formula (I): also referred to as "phloroglucinol", manufactured by Wako Pure Chemical Industries, Ltd.)

Curing agent 4: a mixture of phenol resins having at least one partial structure selected from the group consisting of Formulae (IIa), (IIb), (IIc) and (IId) (specific phenol resin): a compound that contains a specific phenol resin (hydroxy equivalent: 65, softening point: 55° C., number-average molecular weight: 400, weight-average molecular weight: 550) containing partial structures derived from 1,2-dihydroxybenzene and 1,3-dihydroxybenzene in which Ar is Formula (IIIa), $R^{11}$ is a hydroxy group and $R^{12}$ and $R^{13}$ are hydrogen atoms; monomer content: 35%

Curing agent 5: a novolac-phenol resin having a hydroxy equivalent of 105 and a melting point of 85° C.
(B) Epoxy Resin Epoxy resin 1: a biphenyl-type epoxy resin having an epoxy equivalent weight of 172 and a melting point of 130° C. (manufactured by Mitsubishi Chemical Corporation, trade name "EPIKOTE YL6121H")
(C) Filler Filler 1: spherical alumina having a primary particle size of 18 μm (manufactured by Sumitomo Chemical Co., Ltd., trade name "ADVANCED ALUMINA AA-18")

(Other Additives)

Curing accelerator: triphenylphosphine (manufactured by Hokko Chemical Industry Co., Ltd., trade name "P-1")

Mold release agent: glycol montanate (manufactured by Clariant Japan K.K., trade name "LICOWAX E")

The curing agents 4 and 5 were each synthesized by the below-described methods.
<Curing Agent 4>

In a 2-L separable flask equipped with a stirrer, a condenser and a thermometer, 627 g of resorcin, 33 g of catechol, 182.5 g of 37% formalin, 2.0 g of oxalic acid and 400 g of water were loaded, and the flask was heated in an oil bath to 100° C. The reaction was continued for 3 hours under reflux at a temperature of about 102° C. Then, the temperature inside the flask was raised to 150° C. while distilling off water. The reaction was further continued for 12 hours with the temperature being maintained at 150° C. Thereafter, the resultant was concentrated for 20 minutes under reduced pressure to remove water and the like from the system, thereby obtaining the desired curing agent 4. FIG. 1 shows the changes in the weight-average molecular weight in this synthesis, and FIG. 2 shows the changes in the contents (the numbers of molecular nuclei) of monomer, dimer, trimer and other (tetrameric and higher-order molecules). FIGS. 3 and 4 show the GPC chart and FD-MS chart of the thus obtained phenol resin, respectively.

The changes in the respective content shown in FIG. 2 were determined from such a chart shown in FIG. 3 obtained by GPC measurements of products recovered at certain time intervals, and the contents of monomer, dimer, trimer and tetrameric and higher-order molecules were determined from the areas of the peaks in the GPC chart shown in FIG. 3 wherein, along the abscissa indicating the retention time, the last peak was defined to be of a monomer; the second last peak was defined to be of a dimer; the third last peak was defined to be of a trimer; and other peaks appearing therebefore were defined to be of tetrameric and higher-order molecules. Therefore, those components that are referred to as "dimer" or "trimer" do not necessarily each mean the same component, and each peak is thus thought to represent a phenol resin mixture.

As the reaction proceeded, the weight-average molecular weight was reduced as shown in FIG. 1; stable dimer and trimer were generated as shown in FIG. 2; the phenol resin had a hydroxy equivalent of 65, which is higher than the theoretical value (about 60); and, in the FD-MS spectrum chart shown in FIG. 4, the molecular weight peaks of xanthene derivative structures having the respective structural formula and molecular weight (FW.) shown below clearly appeared. From these points and the like, it is understood that a phenol resin having at least one partial structure selected from the group consisting of Formulae (IIa), (IIb), (IIc) and (IId) was obtained.

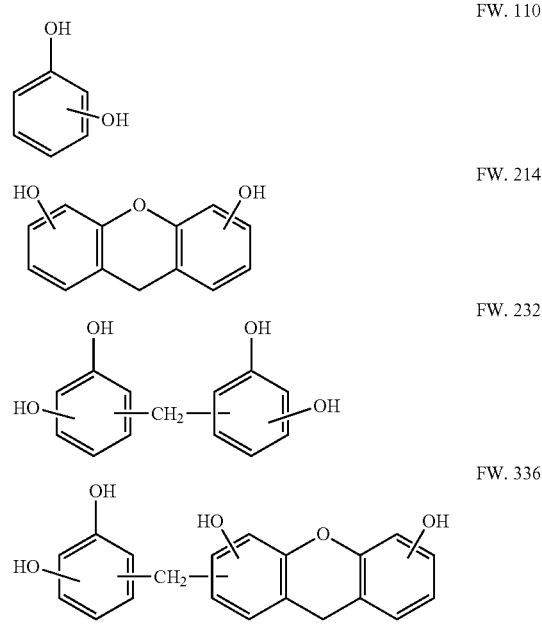

-continued

FW. 354

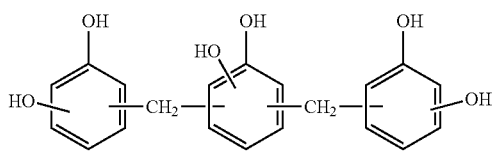

<Curing Agent 5>

In a 1-L separable flask equipped with a stirrer, a condenser and a thermometer, 94 g of phenol, 48.7 g of 37% formalin and 2.5 g of oxalic acid were loaded, and the flask was heated in an oil bath to 100° C. The reaction was continued for 5 hours under reflux at a temperature of about 100° C. Then, the temperature inside the flask was raised to 150° C. while distilling off water. The reaction was further continued for 12 hours with the temperature being maintained at 150° C. Thereafter, the resultant was concentrated for 20 minutes under reduced pressure to remove water, unreacted substances and the like from the system, thereby obtaining the desired curing agent 5.

The physical property values of the thus obtained curing agents were measured as follows.

The number-average molecular weight (Mn) and the weight-average molecular weight (Mw) were measured using a high-performance liquid chromatography system L6000 manufactured by Hitachi, Ltd. and a data analyzer C-R4A manufactured by Shimadzu Corporation. As the GPC columns for the analysis, G2000HXL and G3000HXL, both of which are manufactured by Tosoh Corporation, were employed. As the detector, an RI detector L-3300 manufactured by Hitachi, Ltd. was employed. Each sample was adjusted to have a concentration of 0.2% and measured at a flow rate of 1.0 mL/min using tetrahydrofuran as the mobile phase. A calibration curve was prepared using standard polystyrene samples, and the number-average molecular weight and the weight-average molecular weight were calculated in terms of polystyrene using the calibration curve.

The hydroxy equivalent was measured by an acetyl chloride-potassium hydroxide titration method. Since the solution had a dark color, the titration end-point was determined not by a coloration method using an indicator, but by potentiometric titration. Specifically, the hydroxy equivalent was measured by converting the hydroxy groups of the resin to be measured into acetyl chloride in a pyridine solution, decomposing excess reagent with water, and then titrating the generated acetic acid with a potassium hydroxide/methanol solution.

FD-MS analysis (field desorption ionization mass-spectrometry) was performed using an FD-MS unit-equipped JMS-700 double-focusing mass spectrometer manufactured by JEOL Ltd. The specific phenol resin dissolved in acetone was coated on a carbon emitter and the measurement was performed under the following conditions.

Ionization method: FD (+)
Acceleration voltage: 8 kV
Scanning range: m/z 10 to 2,000

Examples 1 to 9 and Comparative Examples 1 to 3

The above-described (A) epoxy resin curing agent, (B) epoxy resin, (C) filler and other additives were blended in accordance with the formulations shown in Table 1 and the resultants were each roll-kneaded at a kneading temperature of 80° C. for a kneading period of 10 minutes, thereby preparing the respective phenolic resin compositions of Examples 1 to 9 and Comparative Examples 1 to 3. Here, the (C) filler was blended such that the amount of the filler 1, alumina, was 70% by volume of each phenolic resin composition. Further, the curing accelerator and the mold release agent were each added in an amount of 1 part by mass with respect to 100 parts by mass of the (B) epoxy resin. It is noted here that, in Table 1, the unit of the blended components is "parts by mass" and "-" indicates that the component was not blended.

Using compression molding machine, the thus obtained phenolic resin compositions were each molded at a die temperature of 180° C. and a molding pressure of 9.8 MPa for a curing time of 10 minutes. The post-curing of the resulting molded articles were performed at 190° C. for 2 hours and then at 220° C. for 4 hours, thereby preparing cured products of the respective phenolic resin compositions corresponding to Examples 1 to 9 and Comparative Examples 1 to 3.

For the thus obtained cured products of the phenolic resin compositions, the thermal conductivity and the glass transition temperature (Tg) were evaluated. The evaluation results are shown in Table 1. Further, the properties of each phenolic resin composition were measured by the following test methods.

(Thermal Conductivity)

The thermal conductivity was measured by a xenon (Xe)-flash laser method using LFEA4447-type nanoflash apparatus manufactured by NETZSCH Co. The specific heat capacity, the density and the thermal diffusion of a test piece processed into a size of 10 mm×10 mm×2 mm were multiplied and this value was defined as the thermal conductivity (W/m·K).

(Glass Transition Temperature)

The glass transition temperature was measured by a wide-range dynamic viscoelasticity measurement method (DVE) using DIVE-V4 manufactured by UBM. A test piece processed into a size of 1.6 mm×3 mm×20 mm was measured at a frequency of 10 Hz and a heating rate of 5° C./min, and the peak temperature at which the thus obtained loss tangent (tan δ) reaches a maximum value was defined as the glass transition temperature (Tg).

TABLE 1

|  |  | Example | | | | | | | | | Comparative Example | | |
| --- | --- | --- | --- | --- | --- | --- | --- | --- | --- | --- | --- | --- | --- |
|  |  | 1 | 2 | 3 | 4 | 5 | 6 | 7 | 8 | 9 | 1 | 2 | 3 |
| Hydroxybenzene derivative | Curing agent 1 | 10 | 20 | 30 | 50 | 70 | 90 | — | — | 20 | — | 100 | — |
|  | Curing agent 2 | — | — | — | — | — | — | 20 | — | — | — | — | — |
|  | Curing agent 3 | — | — | — | — | — | — | — | 20 | — | — | — | — |

TABLE 1-continued

|  |  | Example | | | | | | | | | Comparative Example | | |
|---|---|---|---|---|---|---|---|---|---|---|---|---|---|
|  |  | 1 | 2 | 3 | 4 | 5 | 6 | 7 | 8 | 9 | 1 | 2 | 3 |
| Specific phenol resin | Curing agent 4 | 90 | 80 | 70 | 50 | 30 | 10 | 80 | 80 | 70 | 100 | — | — |
| Other curing agent | Curing agent 5 | — | — | — | — | — | — | — | — | 10 | — | — | 100 |
| Epoxy resin 1 |  | 274 | 288 | 302 | 330 | 359 | 387 | 288 | 288 | 278 | 259 | 401 | 161 |
| Filler 1 |  | 2,949 | 3,061 | 3,174 | 3,399 | 3,625 | 3,850 | 3,061 | 3,061 | 3,366 | 2,836 | 3,963 | 2,052 |
| Curing accelerator |  | 3 | 3 | 3 | 3 | 4 | 4 | 3 | 3 | 3 | 3 | 4 | 2 |
| Mold release agent |  | 3 | 3 | 3 | 3 | 4 | 4 | 3 | 3 | 3 | 3 | 4 | 2 |
| Thermal conductivity (W/m · K) |  | 6.2 | 6.5 | 6.5 | 6.8 | 6.2 | 6.0 | 6.6 | 6.8 | 6.3 | 5.8 | 5.8 | 4.8 |
| Tg (° C.) |  | 176 | 178 | 170 | 170 | 172 | 164 | 190 | 186 | 175 | 167 | 140 | 155 |

It is seen that the cured products which were obtained from the phenolic resin compositions of the invention prepared using an epoxy resin curing agent containing a hydroxybenzene represented by Formula (I) and a phenol resin having at least one partial structure selected from the group consisting of Formulae (IIa), (IIb), (IIc) and (IId) in combination with an epoxy resin each showed superior thermal conductivity and a higher glass transition temperature (Tg) than those of the cured products obtained from the phenolic resin compositions of Comparative Examples.

The disclosure of Japanese Patent Application No. 2012-151657 is hereby incorporated by reference in its entirety.

All the references, patent applications and technical standards that are described in the present specification are hereby incorporated by reference to the same extent as if each individual reference, patent application or technical standard is concretely and individually described to be incorporated by reference.

The invention claimed is:

1. A phenolic resin composition, comprising:
   an epoxy resin curing agent that comprises a hydroxybenzene derivative represented by the following Formula (I) and a phenol resin having at least one partial structure selected from the group consisting of the following Formulae (IIa), (IIb), (IIc) and (IId); and
   an epoxy resin:

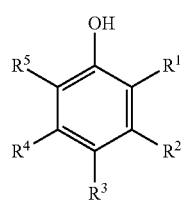

(I)

wherein each of $R^1$, $R^2$, $R^3$, $R^4$ and $R^5$ independently represents a hydroxy group, a hydrogen atom, or an alkyl group having from 1 to 8 carbon atoms; and at least two of $R^1$, $R^2$, $R^3$, $R^4$ and $R^5$ are hydroxy groups;

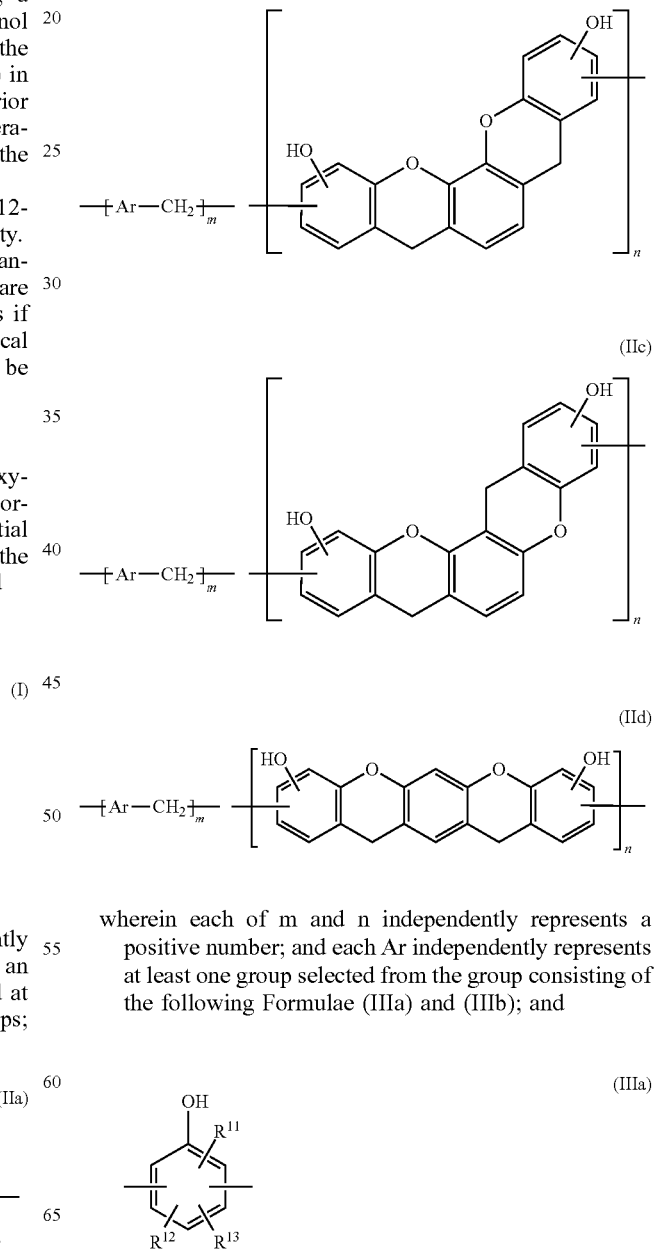

wherein each of m and n independently represents a positive number; and each Ar independently represents at least one group selected from the group consisting of the following Formulae (IIIa) and (IIIb); and

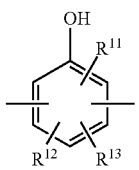

(IIIa)

-continued

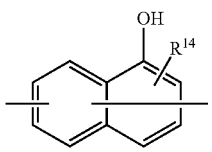
(IIIb)

wherein $R^{11}$ represents a hydrogen atom or a hydroxy group; each of $R^{12}$ and $R^{13}$ independently represents a hydrogen atom or an alkyl group having from 1 to 8 carbon atoms; and $R^{14}$ represents a hydrogen atom or a hydroxy group, wherein a content of the hydroxybenzene derivative is from 30% by mass to 80% by mass with respect to a total mass of the epoxy resin curing agent.

2. The phenolic resin composition according to claim 1, wherein a mass ratio of a content of the phenol resin with respect to a content of the hydroxybenzene derivative (phenol resin/hydroxybenzene derivative) is from 50/50 to 70/30.

3. The phenolic resin composition according to claim 1, wherein the epoxy resin has an epoxy equivalent weight of from 100 to 300.

4. The phenolic resin composition according to claim 1, wherein the epoxy resin has a partial structure represented by the following Formula (IV):

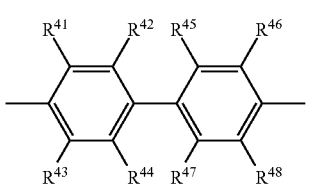
(IV)

wherein each of $R^{41}$, $R^{42}$, $R^{43}$, $R^{44}$, $R^{45}$, $R^{46}$, $R^{47}$ and $R^{48}$ independently represents a hydrogen atom, a hydrocarbon group having from 1 to 10 carbon atoms, or an alkoxy group having from 1 to 10 carbon atoms.

5. The phenolic resin composition according to claim 4, wherein the epoxy resin having the partial structure represented by Formula (IV) is a compound represented by the following Formula (V):

wherein each of $R^{41}$, $R^{42}$, $R^{43}$, $R^{44}$, $R^{45}$, $R^{46}$, $R^{47}$ and $R^{48}$ independently represents a hydrogen atom or a hydrocarbon group having from 1 to 10 carbon atoms; and n represents an integer from 0 to 3.

6. The phenolic resin composition according to claim 1, further comprising an inorganic filler.

7. A phenolic resin composition, comprising:
an epoxy resin curing agent that comprises a hydroxybenzene derivative represented by the following Formula (I) and a phenol resin having at least one partial structure selected from the group consisting of the following Formulae (IIa), (IIb), (IIc) and (IId); and
an epoxy resin:

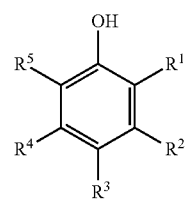
(I)

wherein each of $R^1$, $R^2$, $R^3$, $R^4$ and $R^5$ independently represents a hydroxy group, a hydrogen atom, or an alkyl group having from 1 to 8 carbon atoms; and two of $R^1$, $R^2$, $R^3$, $R^4$ and $R^5$ are hydroxy groups;

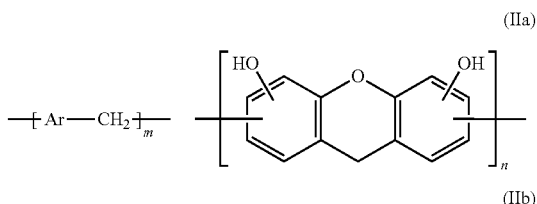
(IIa)

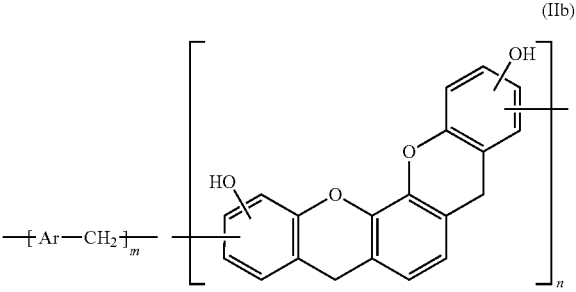
(IIb)

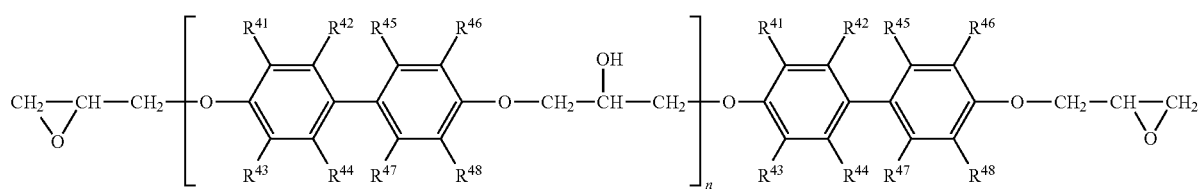
(V)

-continued

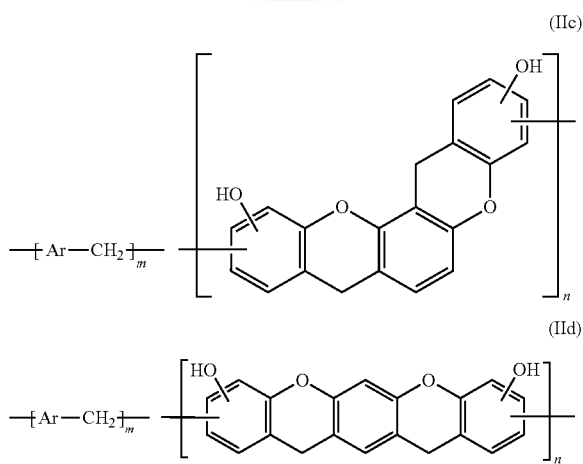

(IIc)

(IId)

wherein each of m and n independently represents a positive number; and each Ar independently represents at least one group selected from the group consisting of the following Formulae (IIIa) and (IIIb); and

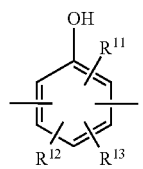

(IIIa)

-continued

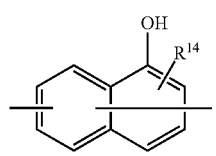

(IIIb)

wherein $R^{11}$ represents a hydrogen atom or a hydroxy group; each of $R^{12}$ and $R^{13}$ independently represents a hydrogen atom or an alkyl group having from 1 to 8 carbon atoms; and $R^{14}$ represents a hydrogen atom or a hydroxy group, and a content of the hydroxybenzene derivative is from 30% by mass to 80% by mass with respect to a total mass of the epoxy resin curing agent.

8. The phenolic resin composition according to claim 7, wherein $R^2$ and $R^4$ in Formula (I) are hydroxy groups.

9. The phenolic resin composition according to claim 7, wherein $R^1$ and $R^3$ in Formula (I) are hydroxy groups.

10. The phenolic resin composition according to claim 7, wherein a mass ratio of a content of the phenol resin with respect to a content of the hydroxybenzene derivative (phenol resin/hydroxybenzene derivative) is from 50/50 to 70/30.

11. The phenolic resin composition according to claim 7, wherein the epoxy resin has an epoxy equivalent weight of from 100 to 300.

12. The phenolic resin composition according to claim 7, wherein the epoxy resin has a partial structure represented by the following Formula (IV):

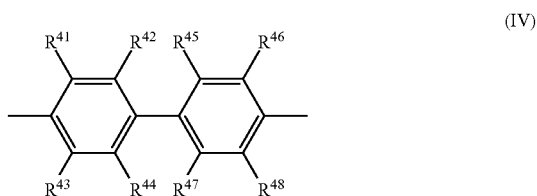

(IV)

wherein each of $R^{41}$, $R^{42}$, $R^{43}$, $R^{44}$, $R^{45}$, $R^{46}$, $R^{47}$ and $R^{48}$ independently represents a hydrogen atom, a hydrocarbon group having from 1 to 10 carbon atoms, or an alkoxy group having from 1 to 10 carbon atoms.

13. The phenolic resin composition according to claim 12, wherein the epoxy resin having the partial structure represented by Formula (IV) is a compound represented by the following Formula (V):

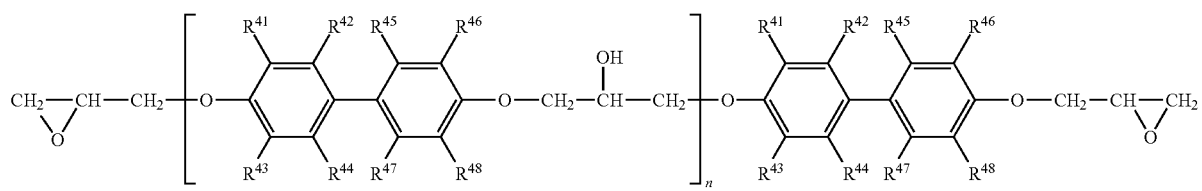

(V)

wherein each of $R^{41}$, $R^{42}$, $R^{43}$, $R^{44}$, $R^{45}$, $R^{46}$, $R^{47}$ and $R^{48}$ independently represents a hydrogen atom or a hydrocarbon group having from 1 to 10 carbon atoms; and n represents an integer from 0 to 3.

14. The phenolic resin composition according to claim 7, further comprising an inorganic filler.

15. A heat conductive material for an electric component, the heat conductive material comprising:

a phenolic resin composition, containing:

an epoxy resin curing agent that comprises a hydroxybenzene derivative represented by the following Formula (I) and a phenol resin having at least one partial structure selected from the group consisting of the following Formulae (IIa), (IIb), (IIc) and (IId); and an epoxy resin:

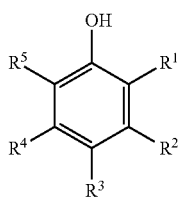
(I)

wherein each of $R^1$, $R^2$, $R^3$, $R^4$ and $R^5$ independently represents a hydroxy group, a hydrogen atom, or an alkyl group having from 1 to 8 carbon atoms; and at least two of $R^1$, $R^2$, $R^3$, $R^4$ and $R^5$ are hydroxy groups;

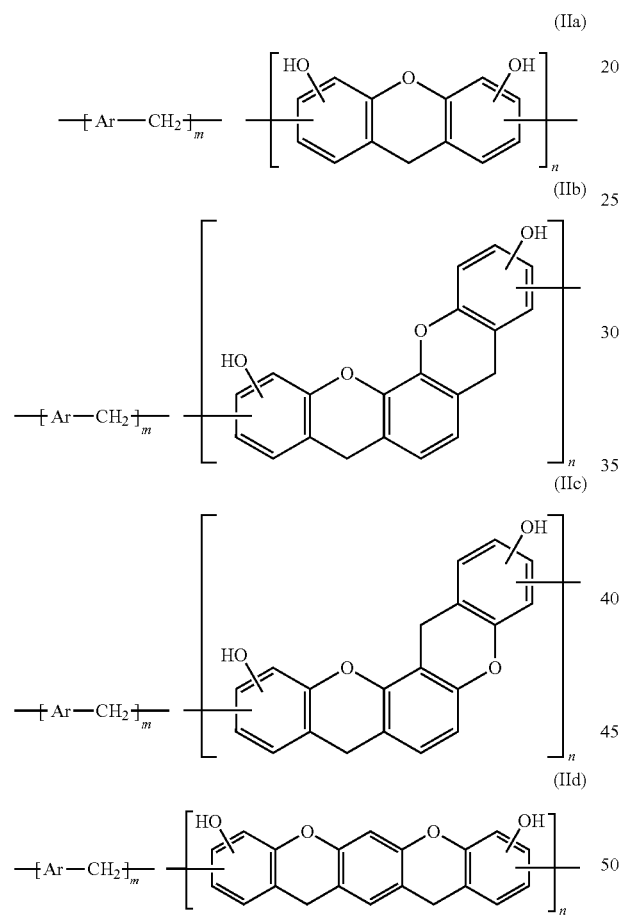

wherein each of m and n independently represents a positive number; and each Ar independently represents at least one group selected from the group consisting of the following Formulae (IIIa) and (IIIb); and

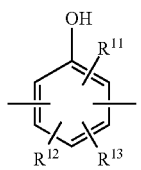
(IIIa)

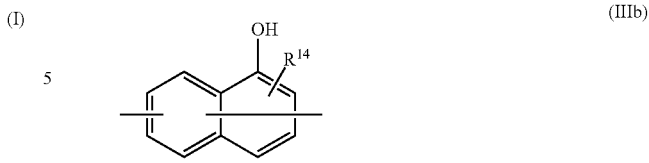
(IIIb)

wherein $R^{11}$ represents a hydrogen atom or a hydroxy group; each of $R^{12}$ and $R^{13}$ independently represents a hydrogen atom or an alkyl group having from 1 to 8 carbon atoms; and $R^{14}$ represents a hydrogen atom or a hydroxy group, wherein a content of the hydroxybenzene derivative is from 30% by mass to 80% by mass with respect to a total mass of the epoxy resin curing agent.

16. An electric component comprising a heat conductive material, the heat conductive material comprising:

a phenolic resin composition, containing:

an epoxy resin curing agent that comprises a hydroxybenzene derivative represented by the following Formula (I) and a phenol resin having at least one partial structure selected from the group consisting of the following Formulae (IIa), (IIb), (IIc) and (IId); and an epoxy resin:

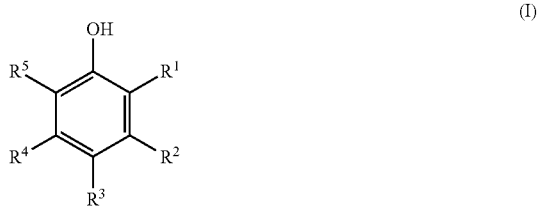
(I)

wherein each of $R^1$, $R^2$, $R^3$, $R^4$ and $R^5$ independently represents a hydroxy group, a hydrogen atom, or an alkyl group having from 1 to 8 carbon atoms; and at least two of $R^1$, $R^2$, $R^3$, $R^4$ and $R^5$ are hydroxy groups;

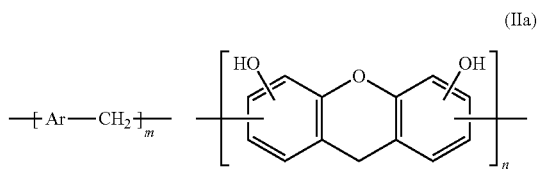
(IIa)

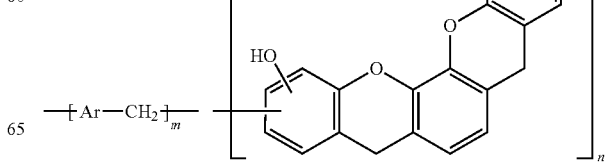
(IIb)

-continued

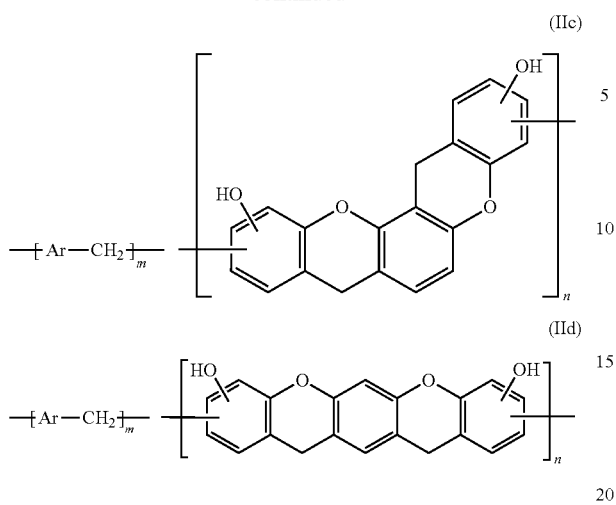

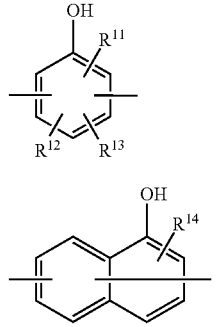

wherein each of m and n independently represents a positive number; and each Ar independently represents at least one group selected from the group consisting of the following Formulae (IIIa) and (IIIb); and wherein $R^{11}$ represents a hydrogen atom or a hydroxy group; each of $R^{12}$ and $R^{13}$ independently represents a hydrogen atom or an alkyl group having from 1 to 8 carbon atoms; and $R^{14}$ represents a hydrogen atom or a hydroxy group, wherein a content of the hydroxybenzene derivative is from 30% by mass to 80% by mass with respect to a total mass of the epoxy resin curing agent.

* * * * *